US012399576B2

(12) United States Patent
Petty et al.

(10) Patent No.: US 12,399,576 B2
(45) Date of Patent: Aug. 26, 2025

(54) INPUT DEVICE

(71) Applicant: Blackmagic Design Pty Ltd, South Melbourne (AU)

(72) Inventors: Grant David Petty, Albert Park (AU); Simon Milne Kidd, Malvern East (AU); John Anthony Vanzella, Brunswick East (AU); Shannon Howard Smith, Altona (AU); Andrew James Godin, Altona North (AU); Benjamin Hill, Moorabbin (AU); Lachlan James Karp, Strathmore (AU)

(73) Assignee: Blackmagic Design Pty Ltd, South Melbourne (AU)

( * ) Notice: Subject to any disclaimer, the term of this patent is extended or adjusted under 35 U.S.C. 154(b) by 0 days.

(21) Appl. No.: 18/461,286

(22) Filed: Sep. 5, 2023

(65) Prior Publication Data

US 2024/0077951 A1 Mar. 7, 2024

(30) Foreign Application Priority Data

Sep. 6, 2022 (AU) .................. 2022902565

(51) Int. Cl.
*G06F 3/02* (2006.01)
*G06F 3/0354* (2013.01)
(Continued)

(52) U.S. Cl.
CPC ........ *G06F 3/0213* (2013.01); *G06F 3/03549* (2013.01); *G06F 3/0362* (2013.01); *G06F 3/038* (2013.01)

(58) Field of Classification Search
CPC .. G06F 3/0213; G06F 3/03549; G06F 3/0362; G06F 3/038; G06F 3/0312;
(Continued)

(56) References Cited

U.S. PATENT DOCUMENTS 6,282,082 B1    8/2001  Armitage et al.
7,441,193 B1 *  10/2008 Wild ..................... G06F 3/0219
                                                            345/173
(Continued)

OTHER PUBLICATIONS

Filmlight, "Blackboard 2", [retrieved from internet on Jun. 16, 2023] <URL:https://web.archive.org/web/20220523133850/https://www.filmlight.ltd.uk/pdf/datasheets/FL-BL-DS-0794-Blackboard2.pdf> published on May 23, 2022 as per Wayback Machine, 2 pages. (Year: 2022).*

(Continued)

*Primary Examiner* — Brent D Castiaux
(74) *Attorney, Agent, or Firm* — Seed Intellectual Property Law Group LLP

(57) ABSTRACT

An input device includes a control surface for a color correction system. The control surface includes a housing with an upwardly facing control panel. The control panel has a proximal edge which is nearest a user and a distal edge that is furthest from a user in normal use. The control panel includes a plurality of controls. The plurality of controls includes: a plurality of trackballs, wherein each trackball comprises a ball and a control ring, said ball cooperating with at least one encoder to generate a multi-dimensional control signal based on motion of the ball, and said control ring cooperating with at least one encoder to generate a one dimensional control signal based on the rotational motion of the ring, wherein the ball of said trackball is mounted concentrically with said control ring; a plurality of control buttons; and a plurality of knobs coupled to respective rotary encoders.

22 Claims, 16 Drawing Sheets

(51) Int. Cl.
*G06F 3/0362* (2013.01)
*G06F 3/038* (2013.01)

(58) Field of Classification Search
CPC .... G06F 1/1626; G06F 1/1632; G06F 1/1654; G06F 1/1671; H04N 9/68
See application file for complete search history.

(56) References Cited

U.S. PATENT DOCUMENTS

| | | | |
|---|---|---|---|
| 8,363,014 B2 | 1/2013 | Leung et al. | |
| 10,198,045 B1* | 2/2019 | Kong | H04B 5/26 |
| 2005/0231476 A1* | 10/2005 | Armstrong | G06F 3/0346 345/161 |
| 2008/0048984 A1 | 2/2008 | Ikeda | |
| 2017/0262080 A1* | 9/2017 | Armstrong | G06F 3/0346 |
| 2018/0210506 A1* | 7/2018 | Hui | G06F 1/1654 |
| 2019/0138121 A1* | 5/2019 | Selby | G06F 3/03549 |

OTHER PUBLICATIONS

Blackmagic Design, "DaVinci Resolve Advanced Panel" [retrieved from internet on Jun. 19, 2023] < URL: https://web.archive.org/web/20220123034908/https://www.blackmagicdesign.com/api/print/to-pdf/products/davinciresolve/techspecs/W-DRE-06?filename=davinci-resolve-advanced-panel-techspecs.pdf > published on Jan. 23, 2022 as per Wayback Machine, 4 pages.

Filmlight, "Blackboard 2", [retrieved from internet on Jun. 16, 2023]< URL: https://web.archive.org/web/20220523133850/https://www.filmlight.ltd.uk/pdf/datasheets/FL-BL-DS-0784-Blackboard2.pdf > published on May 23, 2022 as per Wayback Machine, 2 pages.

Australian Government, IP Australia, International-type search report for AU Application No. 2022902565, dated Jun. 21, 2023, 21 pages.

Avid Technology, Inc. "AvidDock Guide, Installation and Overview", © 2021, https://resources.avid.com/SupportFiles/ProMixing/Avid_Dock_Guide_v2021.6.pdf, 39 pages.

Thornton, M., posted Mar. 25, 18 "The History of Pro Tools—2012 to 2018", https://www.production-expert.com/home-page/2018/3/8/the-history-of-pro-tools-2012-to-2018, including section "2015—Avid Pro Tools Dock Control Surface", downloaded Sep. 5, 2023.

Extended European Search Report for EP Application No. 23195805.9, dated Nov. 28, 2023, 10 pages.

Carman Robbie "Focus On The New Blackmagic Resolve Mini Panel", Apr. 9, 2017, pp. 1-12, XP093103655, Retrieved from the Internet: URL:https://web.archive.org/web/20220630195606/https://mixinglight.com/color-grading-tutorials/color-correction-gear-headmarch-2017-edition/ [retrieved on Nov. 20, 2023].

Elwyn, Jonny "Affordable Colour Grading Control Surfaces", Aug. 17, 2022, pp. 1-42, XP093103491, Retrieved from the Internet: URL:https://web.archive.org/web/20220817101452/https://jonnyelwyn.co.uk/film-video-editing-tools-for-editors/affordablecolour-grading-control-surfaces/ [retrieved on Nov. 20, 2023].

Avid Technology, Inc. "Avid Dock", Nov. 20, 2023, pp. 1-3, XP093103633, http://www.avid.com/products/avid-dock Retrieved from the Internet: URL:https://web.archive.org/web/20220808072140/https://www.avid.com/products/avid-dock [retrieved on Nov. 20, 2023].

* cited by examiner

INPUT DEVICE

BACKGROUND

Technical Field

The present disclosure relates to an input device.

The input device takes the form of a control surface for a color correction system.

BRIEF SUMMARY

In the context of the present disclosure, a color correction system will typically include a color correction application running on a computer system. The color correction application could be a standalone color correction application or an application such as a non-linear editor that has a color correction capability as a subset of its functionality. One such example of such a color correction application is Davinci Resolve® from Blackmagic Design. In some embodiments the color correction system may include a special purpose computer system (e.g., video processing appliance, video card or the like) configured to perform color correction of video or still images. The color correction system will include a display device including a screen on which a user may view a graphical user interface for the color correction system and images or videos that are subject to the color correction.

The term "color correction" as used herein (including use in adjectival or nominal form) is intended to have a meaning that includes "color grading" and color adjustment that may be performed on digital video and images for other purposes.

Embodiments of the present disclosure are adapted for use with color correction systems that include a portable display device. In a preferred embodiment, the present disclosure is adapted for use with a color correction system comprising a color correction application running on, or operable via a tablet computer, smart phone or other device of a similar form factor.

The systems, devices, methods and approaches described in this specification, and components thereof are known to the inventors. Therefore, unless otherwise indicated, it should not be assumed that any of such systems, devices, methods, approaches or their components described are citable as prior art merely by virtue of their inclusion in this section, or that such systems, devices, methods, approaches and components would ordinarily be known to a person of ordinary skill in the art.

In a first aspect there is provided a control surface for controlling a color correction system. The control surface may include a housing including an upwardly facing control panel, said control panel having a proximal edge which is nearest a user in normal use and a distal edge that is furthest from a user in normal use.

The control panel includes a plurality of controls that may include:
- a plurality of trackballs, wherein each trackball comprises a ball and a control ring, said ball cooperating with at least one encoder to generate a multi-dimensional control signal based on motion of the ball, said control ring cooperating with at least one encoder to generate a one dimensional control signal based on the rotational motion of the ring, wherein the ball of said trackball is mounted concentrically with said control ring;
- a plurality of control buttons;
- a plurality of knobs coupled to respective rotary encoders;

The control surface can also include:
- a display stand adjacent the distal edge of the control panel for supporting a display device of the color correction system in an upright position in use;
- a power storage system contained within the housing, said power storage system being arranged to supply power to the control surface in use;
- a wireless communications interface over which control signal from the plurality of controls are transmitted for use in controlling the color correction system.

In some embodiments, the power supply system may include one or more of: a battery; and a charging system.

In some embodiments, the wireless communications interface operates according to one of the following wireless communications methodologies: an IEEE 802.11 wireless standard; Bluetooth, ZigBee or other IEEE 802.15 standard, free-space optical communication.

The display stand may comprise any one or more of the following:
- boss, protrusion, rib, lip, flange, beam, channel, step, hole, recess, aperture, indentation, slot, cushion, gripping surface, frame, wall, ledge, shelf, frame, hook and cradle.

Such elements of the display stand can be arranged to perform any one or more of the following functions:
- support the weight of the display device of the color correction system in use;
- constrain any one or more of sliding, twisting, or tilting of the display device of the color correction system in use;
- act as a fulcrum that supports display device of the color correction system in use;
- grip the display device of the color correction system in use.

In some embodiments, the display stand may comprise a channel extending adjacent to the distal edge of the control panel, said channel being adapted to receive an edge of a display device of the color correction system in use, said channel having a front support surface that limits movement of a supported display device of the color correction system in a proximal direction, and a rear support surface that constrains tilting of the supported display device of the color correction system in a distal direction.

Supporting the display device of the color correction system in an upright position may comprise supporting the display device of the color correction system such that it is tilted in a distal direction at an angle of more than 10 degrees from vertical.

The display stand may include an affordance to enable a user to touch a screen of a supported display device of a color correction system, adjacent to the lowermost edge of the screen. The affordance may enable a user to touch a central part of the lowermost edge of the screen. The affordance may be a recess, indentation, groove, or gap.

In some embodiments, the arrangement of trackballs is symmetrical about a centerline of the control panel.

In some embodiments, the display stand can support a display device of the color correction system in a position such that a screen of the display device is symmetrical about said centerline. The display stand may be symmetrical about said centerline.

In some embodiments, the buttons on the control panel may be arranged in groups, and wherein said groups of buttons are positioned symmetrically about the centerline of the control panel. An arrangement of buttons within at least one pair of symmetrically arranged groups of buttons may be different to each other.

In some embodiments, an arrangement of the knobs is symmetrical about the centerline of the control panel.

In some embodiments, the control rings have an upper surface with an outer radius and an inner radius and a surface profile extending in a radial direction that is generally inclined from its outer radius to a point more than half way to its inner radius. The surface profile may be generally inclined from its inner radius to a point less than half way to its outer radius. The control rings may include a substantially cylindrical face around their outer circumference.

The balls of said trackballs may be mounted relative to a top face of the control panel such that the ball has a maximum extension from the top face of the control panel of more than 30% of the diameter of said ball. The extension is measured in a direction parallel with an axis of rotation of the control ring.

The maximum extension may be more than 35% of the diameter of said ball. The maximum extension may be more than 37% of the diameter of said ball. The maximum extension may be more than 40% of the diameter of said ball. The maximum extension may be about 40.5% of the diameter of said ball.

In some embodiments, a control ring may include a coupling that engages with a corresponding coupling mounted in a fixed position with respect to the control panel such that when the control ring is coupled to the corresponding coupling, said control ring retains the ball of a respective trackball in an operating position in the control panel.

The coupling of the control ring may be magnetically attracted to a corresponding coupling of the control panel. The corresponding coupling may include one or more magnets to attract a non-magnetized component of the control ring's coupling.

In some embodiments, supporting a display device of the color correction system in an upright position may comprise supporting the display device of the color correction system such that it is tilted in a distal direction at an angle of less than 40 degrees from vertical. The display device of the color correction system may be tilted in a distal direction at an angle of less than 20 degrees from vertical. The display device of the color correction system may be tilted in a distal direction at an angle of about 17 degrees from vertical.

In some embodiments, a ball of said trackball may extend above a highest point of its respective control ring by more than 15% of the diameter of said ball. The extension is measured in a direction parallel with an axis of rotation of the control ring.

The trackball may extend above a highest point of its respective control ring, by between 23% and 24% of the diameter of said ball.

In some embodiments, the inside diameter of the control ring may be more than 90% of the diameter of the ball of its respective trackball. The inside diameter of the control ring may be less than 100% of the diameter of the ball of said trackball. The inside diameter of the control ring may be about 95% of the diameter of the ball of said trackball.

In some embodiments, the control surface is a battery powered, portable control surface capable of controlling a color correction system via a wireless communication channel.

In another aspect there is provided a color correction system comprising:
  a computer system configured to run a color correction application;
  a display arranged to display a graphical user interface for the color correction application; and
  a control surface according to an embodiment of the first aspect;
  the control surface is in data communication with the computer system such that user inputs made using any one or more of said plurality of trackballs, plurality of buttons and plurality of knobs are communicated as control signals to the computer system to control said color correction application.

In some embodiments, the display forms part of a tablet computer. The tablet computer may be supported in the display stand of the control surface.

In some embodiments, the tablet computer may comprise the computer system and display in a single unit.

In some embodiments, the computer system configured to run a color correction application may be separate from the tablet computer and in data communication therewith.

In some embodiments, the computer system comprises a computer server and said tablet computer comprises a client in data communication with said computer server, and wherein a graphical user interface of the color correction application is provided by said client.

In some embodiments, the control surface may be in data communication with the computer system via at least one wireless network connection.

While the invention(s) disclosed herein are amenable to various modifications and alternative forms, specific embodiments are shown by way of example in the drawings and are described in detail. It should be understood, however, that the drawings and detailed description are not intended to limit the invention(s) to the particular form disclosed. Furthermore, all alternative combinations of two or more of the individual features mentioned or evident from the text or drawings comprise additional aspects or inventive disclosures, which may form the subject of claims.

DETAILED DESCRIPTION

In the following description, numerous specific details are set forth in order to provide a thorough understanding of the present disclosure. It will be apparent, however, that the present disclosure may be practiced without these specific details. In some instances, well-known structures and devices are shown in block diagram form in order to avoid unnecessary obfuscation of salient details.

Figure 1:
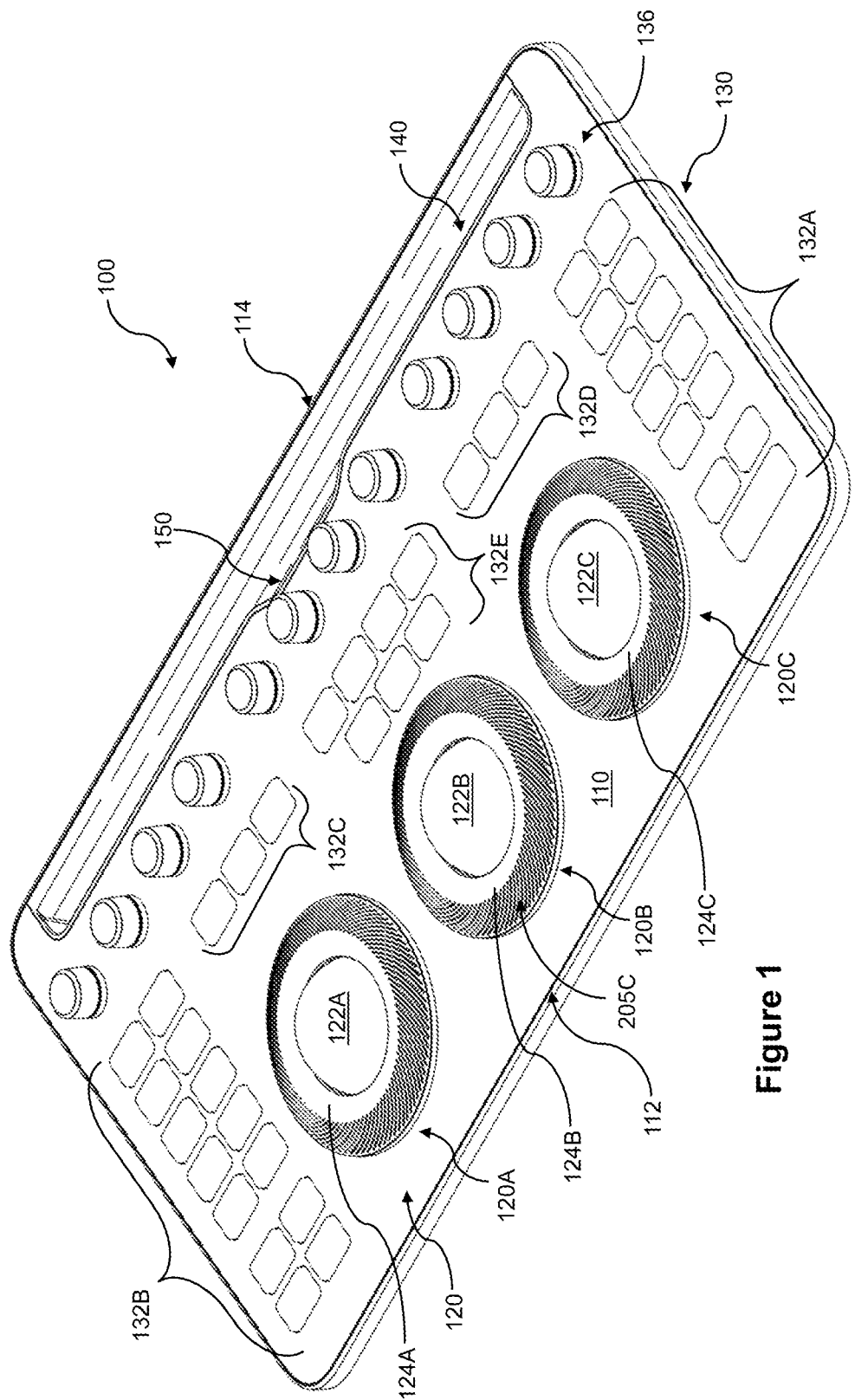
FIG. 1 shows a control surface according to a first embodiment.

FIG. 1 shows a first view of a control surface 100 for controlling a color correction system according to a first exemplary embodiment. The control surface 100, takes the form of a color grading panel that is able to interface with a computer system (not shown) running a software application that performs color correction functionality.

In general, the control surface 100 includes a control panel 110. The control panel in this embodiment is generally rectangular in form and has a proximal (front) edge 112 which is nearest a user in normal use, and a distal edge (back) edge (114) that is furthest from a user in normal use.

The control panel 110 has a series of controls mounted on it in a position that is accessible to a user, to allow the user to control the color correction system. The control panel 110 comprises the uppermost part of the control surface's 100 housing 300. The housing 300 may also include a lower enclosure portion 350. The lower enclosure portion 350 may comprise one or more panels, moldings, chassis, frames, or other members that together define the structure of the housing 300 of the control surface 100.

The control panel includes a plurality of trackballs 120. In this example, three trackballs are used (120A, 120B, 120C). Each trackball (120A, 120B, 120C) comprises a ball (122A, 122B, 122C) that interacts with one or more encoders (not shown) to generate a multi-dimensional control signal based on motion of the ball (122A, 122B, 122C). The ball (122A, 122B, 122C) of each trackball (120A, 120B, 120C) is partly exposed above the control panel 110 to enable a user to interact with the ball (122A, 122B, 122C), and is surrounded by a respective control ring (124A, 124B, 124C). Each ring (124A, 124B, 124C) cooperates with at least one encoder (not shown) such that when the control ring (124A, 124B, 124C) is rotated the rotation is sensed by the respective encoder(s) and a one dimensional control signal can be generated. Each ball (122A, 122B, 122C) is mounted concentrically with its respecting control ring (124A, 124B, 124C).

The control panel 110 also includes a plurality of control buttons (130). The buttons may be physical buttons as illustrated, or could be buttons on a touch screen interface. In such embodiments the control panel will include a touch screen either in place or in addition to physical buttons. The buttons 130 allow users to make certain inputs to the color correction system in use. The specific input generated by operation of one or more of said button may be fixed, or assignable by the user or color correction system. In some forms, the input generated by operation of one or more of said button can be context sensitive. The buttons 130 on the control panel may be arranged in groups (132A, 132B, 132C, 132D, 132E). The groups can be arranged generally symmetrically about the centerline C-C of the control panel 110. For example, the middle group 132E is placed on the centerline C-C, and the arrangement of buttons within that group are symmetrical about the centerline C-C also. The pair of groups 132C and 132D are arranged in symmetry with each other about the centerline C-C. Similarly the pair of groups 132A and 132B are arranged in symmetry with each other about the centerline C-C. However, although the arrangement of the two groups 132A and 132B is symmetrical about the centerline C-C the buttons in the groups 132A and 132B are not the same as each other, nor is their arrangement of buttons a mirror images of each other.

The control panel 110 also includes a plurality of knobs 136 coupled to respective rotary encoders. The knobs enable the level of an input to be adjusted in a user friendly and intuitive manner. The knobs may also be arranged symmetrically about the centerline C-C.

The color control surface 100 also includes a display stand 140. The display stand 140 is able to support a display device of the color correction system in an upright position in use. In this example, the display stand 140 is located adjacent the distal edge 114 of the control panel 110. The display stand 140 is positioned between the rear-most row of input controls, knobs 136, and the distal edge 114 of the control panel 110. But in other embodiments the display stand 140 may be partly, or wholly behind (i.e., further from the user) or aligned with, the distal edge 114 of the control panel 110.

Figure 5:
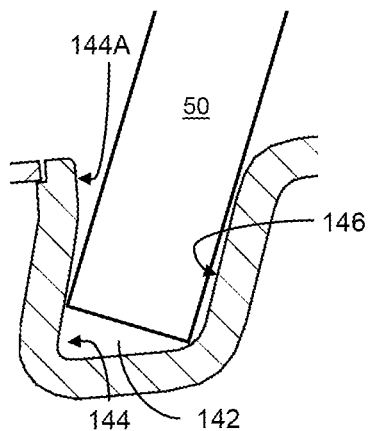
FIG. 5 is a cross section along Y-Y in FIG. 2 showing the profile of the display stand of an embodiment.
Figure 6:
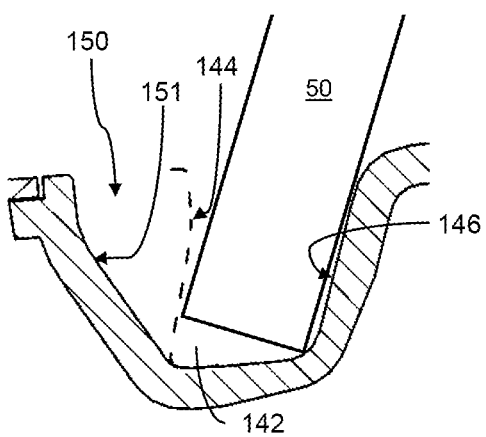
FIG. 6 is a cross section along Z-Z in FIG. 2 showing the profile of an affordance provided in a display stand of an embodiment.

The display stand 140 in this example, includes a channel 142 extending along the distal edge 114 of the control panel 110. The channel 142 is sized and shaped to receive an edge of a display device of the color correction system in use. A cross sectional view of the channel 142 of the display stand 140 at position Y-Y is shown in FIG. 5. FIGS. 5 and 6 also illustrate a lower portion of a display device of the color correction system as it would typically be positioned when supported by the display stand 140 in use. As can be seen in FIG. 5, the channel 142 has a front support surface 144 that is vertical, or slightly sloped. This front support face 144 limits movement of a supported display device of the color correction system in a proximal (forward) direction. Being slightly sloped in the distal direction (rearward) to form an overhang may minimize the chance of the display device falling backwards and its lower edge sliding up the front support surface. The rear support surface 146 of the channel 142 is sloped backwards and has a radius at its top and bottom. The rear support surface 146 constrains the ability of a supported display device to tilt backwards when it is supported in the display stand 140. The floor 148 of the channel 142 sits below and supports the display device in use. The radius at the top of the rear support surface 146 provides a lead-in to the channel. A forwardly sloped lead-in segment 144A is also provided at the top of the front surface 144. The lead-ins assist a user in inserting their display device in the display stand. By sloping the front lead-in forwards a user will feel a good engagement of a display device with the display stand if the display device is inserted in a substantially vertical orientation. The lower radius that leads to the floor 148 of the channel 142 pushes a supported display device 50 forward so that its front lower corner sits against the front face 144. The outside ends of the display stand 140 channel 142 may be open or closed. In this case, they are closed to limit sideways movement of the display device.

As illustrated in FIGS. 5 and 6, the display device 50 of the color correction system will generally be supported in the display stand 140 such that it is tilted back (i.e., in a distal direction) at an angle of more than 10 degrees, but less than 40 degrees from vertical. In this embodiment, when a display device is supported in the display stand 140 it is held an angle of between 15 and 20 degrees from vertical. In particular, in this example it is held at 17 degrees. The exact angle will vary according to the dimensions and shape of the edge of the display device relative to that of the display stand 140. For example, in the case that a tablet computer or smart phone comprises the computer system of the color correction system, the tablet computer or smart phone itself will also be the display device. For a tablet computer or smart phone with a thickness of approximately 6.5 mm thickness, the display device will rest in the display stand at or close to an angle of 17 degrees to the vertical.

The display stand 140 is also arranged (in size, position, shape and/or layout) with respect to the control panel 110, so that it can support a display device of the color correction system in a manner which enables the display device's screen to be positioned generally symmetrically about the centerline C-C of the control panel. This may be achieved in some embodiments by making the display stand 140 symmetrical about the centerline C-C of the control panel 110, as in the present example.

In the present example, the display stand 140 also includes a structure that acts as an affordance 150 to enable access to the display device at a position adjacent to the lowermost edge of the screen. The affordance 150 of the present embodiment takes the form of indentation in the front surface 144 the channel 142. This causes a localized widening of the channel 142. The indentation comprising the affordance 150 is located at the center of the channel 142 and provides physical and visual access to the edge of the display. This is particularly useful if the display device has a special purpose or commonly used interface element located at or near the edge of the display device, such as a home button, front facing camera, sensor, a "swipe up" interface feature such as the "dock" on an iOS device. Such features are more readily accessible and usable via the indentation in the display stand 114, as the affordance 150 enables a user to insert a finger, stylus or other implement into the locally widened portion of the channel 142 to touch a touch screen or button of the display device, or allows line of sight to a sensor located in that position. In some embodiments, the lateral position of the affordance can be chosen to match a display device of a specific predetermined configuration.

A cross sectional view of the channel 142 at a section along line Z-Z (indicated on FIG. 2) is shown in FIG. 6.

At the cross section along line Z-Z, the ordinary shape of the channel's 142 front support surface 144 (shown in dotted lines) has been modified. So, instead of the front face 144 (shown in dotted lines) being substantially vertical or having a small overhang, the front face 151 of the channel 142 at the affordance 150 has a pronounced forward (proximal) slope to increase the width of the entry into the top of the channel. The rear support surface 146 of the channel 142 the same as at cross section Y-Y. The indentation 150 is placed on the centerline C-C 112 of the control panel 110.

In other embodiments, the display stand can take different forms and include different elements. For example, the stand could comprise any one or more of the following: boss, protrusion, rib, lip, flange, beam, channel, step, shelf, hole, recess, aperture, indentation, slot, cushion, gripping surface, frame, wall, ledge, frame, hook or flap. These structures can perform one or more of the following functions either alone or in combination with another structure:

support the weight of the display device of the color correction system in use;
constrain any one or more of sliding, twisting, or tilting of the display device of the color correction system in use;
act as a fulcrum that supports a display device of the color correction system in use;
grip a display device of the color correction system in use.

FIGS. 13A to 13L illustrate six alternative examples of display stands that may be used in other embodiments.

In embodiments with a support stand that takes a different form to that of the illustrative embodiment of FIGS. 1 to 12, the affordance may take a different form also. For example, the affordance may be a gap or space between elements comprising the support structure of the display stand that exposes a similar portion of the screen of the display device.

The display stand 140 of the present embodiment does not protrude above the plane of top face of the control panel 110. It also provides a straight rear edge for the control panel 110 thus the display stand facilitates the color correction panel 100 having smooth edges. Its location between the rear-most controls (knobs 136) and the distal edge assists in setting off any protruding elements of the control panel 110 (such as knobs 136) away from the distal edge of the control panel 110. This may give the present embodiment advantages when used as a portable device, as there is no additional protrusions or physical structure that can snag or catch when the control surface 100 is stowed or removed from a carrier such as a bag, backpack, sleeve or case.

Figure 3:
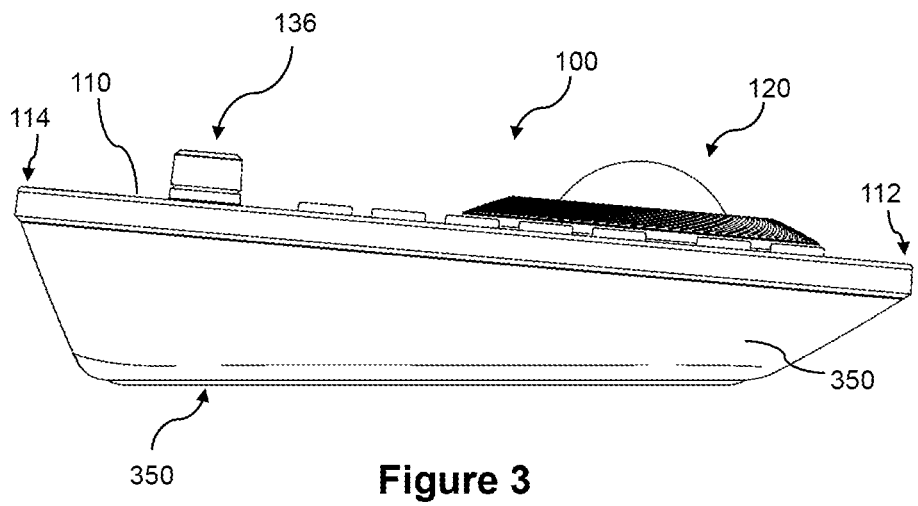
FIG. 3 is a side view of the control surface of FIGS. 1 and 2.

Many conventional color grading control surfaces have their track balls positioned well back from the proximal edge of the control panel. This facilitates a user positioning their hands over the track balls whilst resting their hands or wrists on top of the control panel during use. In contrast to this, embodiments of the control surface 100 may use any one or more of the following factors:

a) a relatively low height of the control panel 110;
b) forward slope of the control panel 110; and
c) proximal positioning of the trackballs 120 to facilitate ease of use of the control surface. FIG. 3 shows a side view of the control surface 100. As can be seen in side view, the control panel 110 of the control surface 100 has a forward slope from its distal edge 114 to its proximal edge 112.

Moreover the height of the proximal edge 112 above a surface on which the control surface is resting (e.g., a tabletop) is relatively low. This height may be between 20 mm and 28 mm. In the illustrated embodiment, it may be about 25 mm. The distal edge 114 of the control surface may be between 30 and 50 mm above the resting surface. In some embodiments, it could be between 35 and 40 mm. The illustrative embodiment is about 40 mm high at the distal edge 114 of the control panel and about 38 mm high adjacent to the distal edge of the knobs 136. The highest point of a track ball's 120 ball 122 may be less than 55 mm, or less than 50 mm above the surface on which the control surface 100 rests in use. In the illustrative embodiment, it can be about 45 mm above the surface. The highest point on the control ring 124 may be less than 45 mm, or less than 40 mm above the surface on which the control surface rests. In the illustrative embodiment, it can be about 37 mm above the surface.

The track balls 120 are positioned in the proximal half of the control panel, i.e., towards the proximal edge 112 of the control surface from the center of the control panel 110. The center of the trackballs 120 may be less than 70 mm from the proximal edge 112, and may be less than 65 mm from the proximal edge 112. In some embodiments, the center of the trackballs may be between 55 and 60 mm from the proximal edge 112. In the illustrated embodiment, the center of the track ball is about 56 mm from the proximal edge 112. In some embodiments, the rearmost edge of the control ring 124 of a track ball may be less than 100 mm from the proximal edge 112, but may be less than 95 mm. In the illustrated embodiment, the rearmost edge of the control ring 124 of a track ball 120 is about 93 mm.

By utilizing a geometry as set out generally above, some embodiments may better preserve a user's experience without retaining the conventional color grading control surfaces' large size. In such embodiments, a user of the control surface 100 may position their hands over the track balls 120 so that they may be used, whilst resting their hands or wrists on a desk/tabletop or other support surface in use in much the same fashion as a conventional computer keyboard would be used (possibly with a wrist support pad if desired).

Such adaptations may also facilitate use of the control surface 100 as a portable device as it may retains overall compact dimensions and usability.

Figure 4:
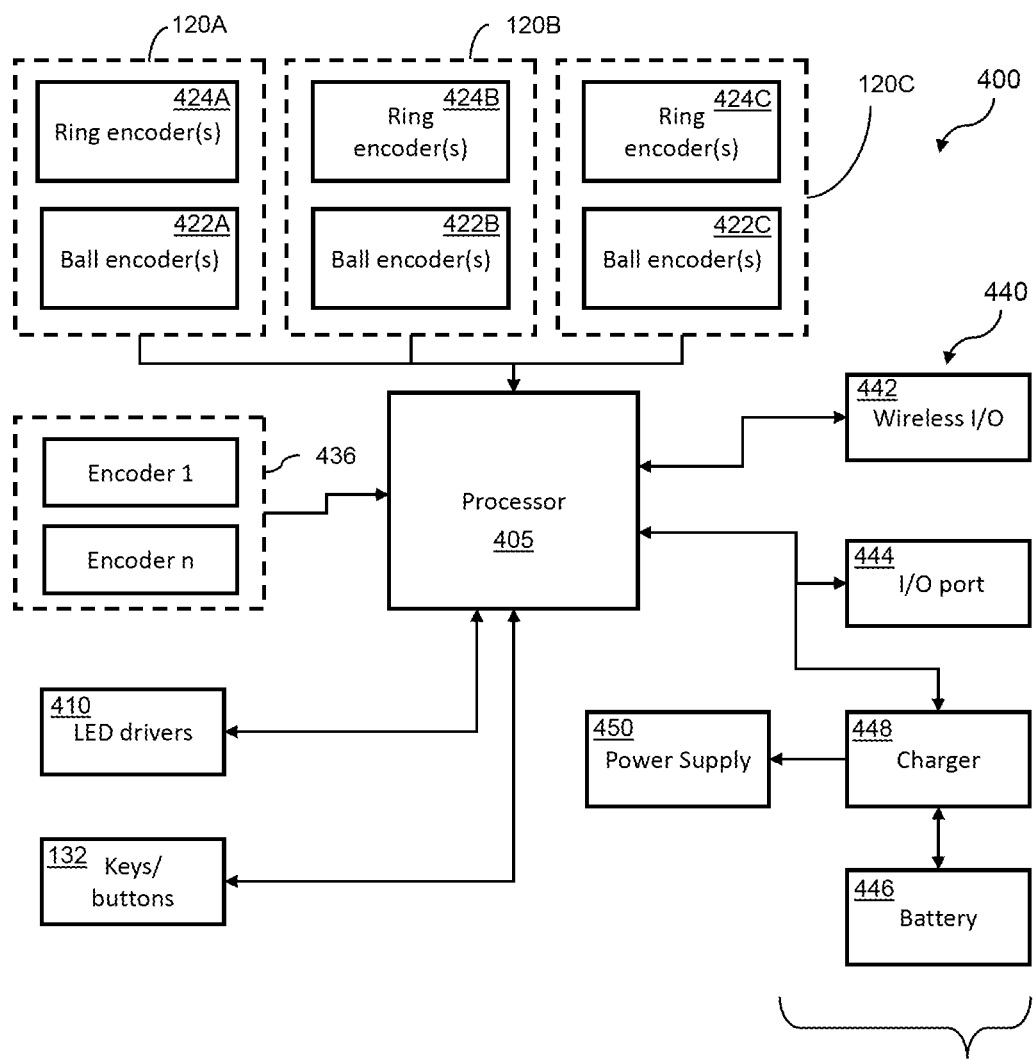
FIG. 4 is a schematic block diagram of the electrical system of the control surface of an embodiment.

FIG. 4 is a schematic block diagram 400 of the electrical components of the control surface 100. Overall control is provided by processor 405 which receives inputs from a variety or input sources as discussed below, and generates control signals for outputting on an I/O system.

The circuitry 400 includes, for each trackball 120A, 120B, 120C: at least one, and in some embodiments more than one, encoder 422A, 422B, 422C that senses motion of the ball 122A, 122B, 122C of the track ball 120A, 120B, 120C; and at least one encoder 424A, 424B, 424C to sense rotational motion of the respective ring 124A, 124B, 124C of the trackball 120A, 120B, 120C. The ball encoder(s) 422A, 422B, 422C for each ball 122A, 122B, 122C generate a multi-dimensional control signal based on motion of the ball 122A, 122B, 122C for use in controlling the color correction system. Each encoder may generate a one dimensional output, with its output being combined with that of another encoder to generate a multidimensional control signal for the ball, or alternatively one or more of the encoders can generate a multidimensional output that is used alone (or in combination with other outputs from other encoders) to generate a multidimensional control signal corresponding to motion of the ball. The encoder (or encoders) associated with a control ring may each generate a one dimensional control signal based on the rotational motion of the ring. Multiple encoders may be used to improve resolution or enable averaging of their outputs.

The circuit 400 also includes a plurality of control buttons (or keys) 132. LED drivers 410 can also optionally be provided to provide illumination of the control panel. For example, buttons may be backlit and may be selectively illuminated or modulated to display their status. Rotary encoders 436 are adjustable via knobs 136 on the control panel 110 and provide a user adjustable input.

The circuit 400 also includes a power supply system 438. The power supply system 438 includes a power storage system 446 (e.g., one or more batteries) arranged to provide power for the control surface 100 in use. The power supply system 438 may optionally include a charger 448 for charging the power storage system 446. Although, in some embodiments, the power storage system 446 may be rechargeable by an external charging system or may be removable or replaceable. The power supply system 438 in this embodiment also includes a power supply 450 which connects the power storage system 446 to the remainder of the circuitry and provides power at the appropriate voltage, if the required voltage is different than the system voltage. For example, the power supply 450 can include one or more regulators (e.g., linear regulator or switched capacitor regulator) and/or switches that run off the system voltage to provide power to different components at the necessary voltage.

In this example, the circuit 400 is provided with a wired interface system 444. This wired interface 444 can provide power to the battery charger 448 and optionally also a data connection to the color correction system to enable control signals and other data to be exchanged between the control surface and the color correction system. In one embodiment, the wired interface 444 is a USB-C port.

In one embodiment, if the control surface 100 is connected to a source of power via the wired interface 444, power is drawn preferentially from the wired interface 444, instead of the power storage system 446. This can be performed utilizing the charger 448 to direct power to the power supply 450 instead of the power storage system 446. Any excess power is sent to the power storage system 446 for charging. When wired interface 444 is not connected, power from the power storage system 446 is sent from to the power supply 450 for powering the device as discussed above. As noted above, because the power storage system 446 may accept a removable or replaceable battery, the wired interface system 444 could be omitted from some embodiments.

The interface system 440 includes a wireless communications interface 442. The wireless communications interface 442 is adapted in use to exchange data and control signals with the color correction system to enable the control surface 100 to control the color correction system. The wireless communications interface 442 may operate according to any wireless communications methodology or protocol but is preferably selected from one of: an IEEE 802.11 wireless standard; Bluetooth, ZigBee or other IEEE 802.15 standard. It may alternatively use free-space optical communication.

Use of a widely accepted wireless communications protocol may facilitate interoperability with different color correction systems. In the illustrative example, the wireless communications interface 442 is a Bluetooth communications interface.

Figure 2:
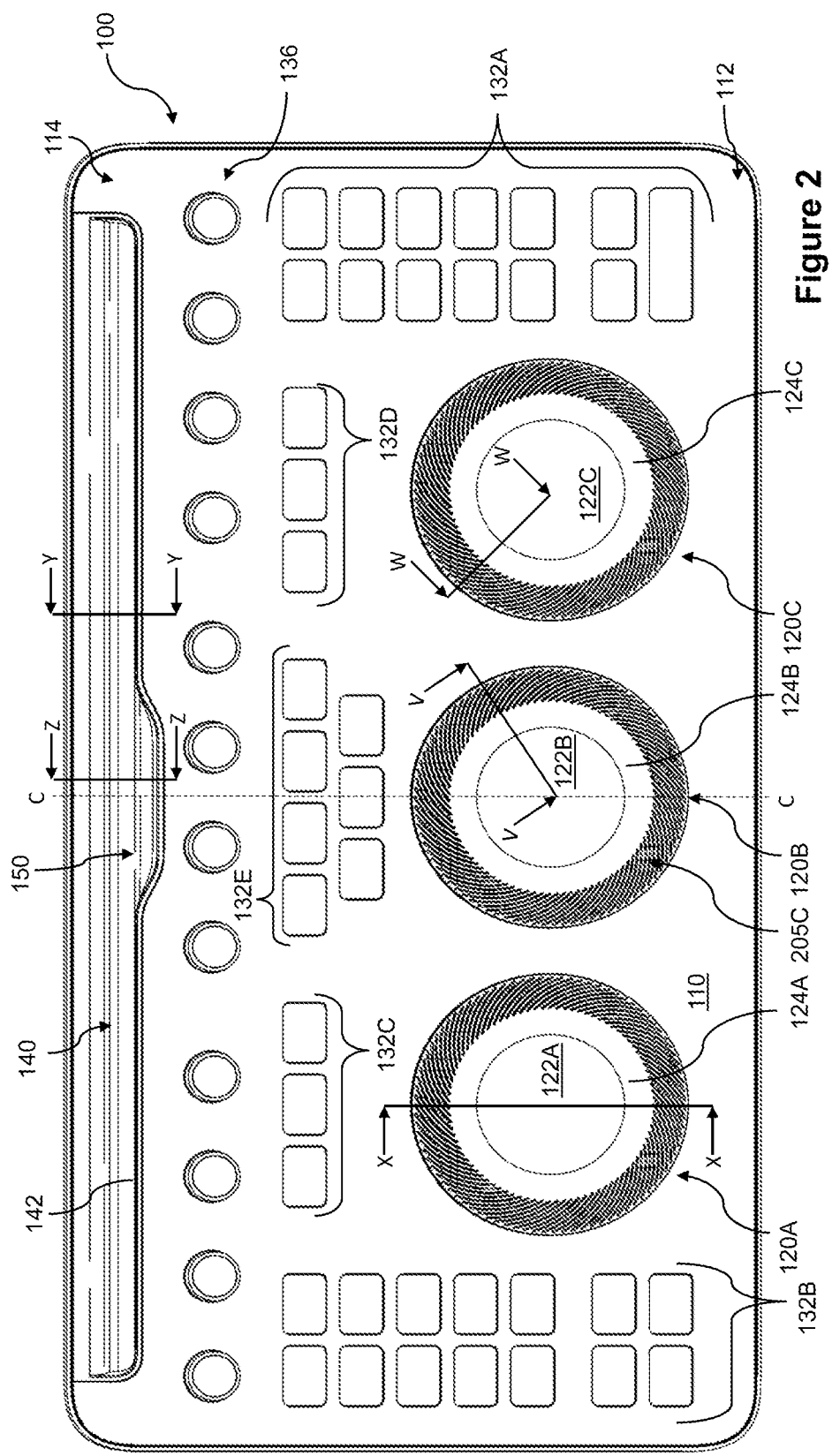
FIG. 2 is a top view of the control surface of FIG. 1 indicating the location of cross sectional views described herein.
Figure 7:
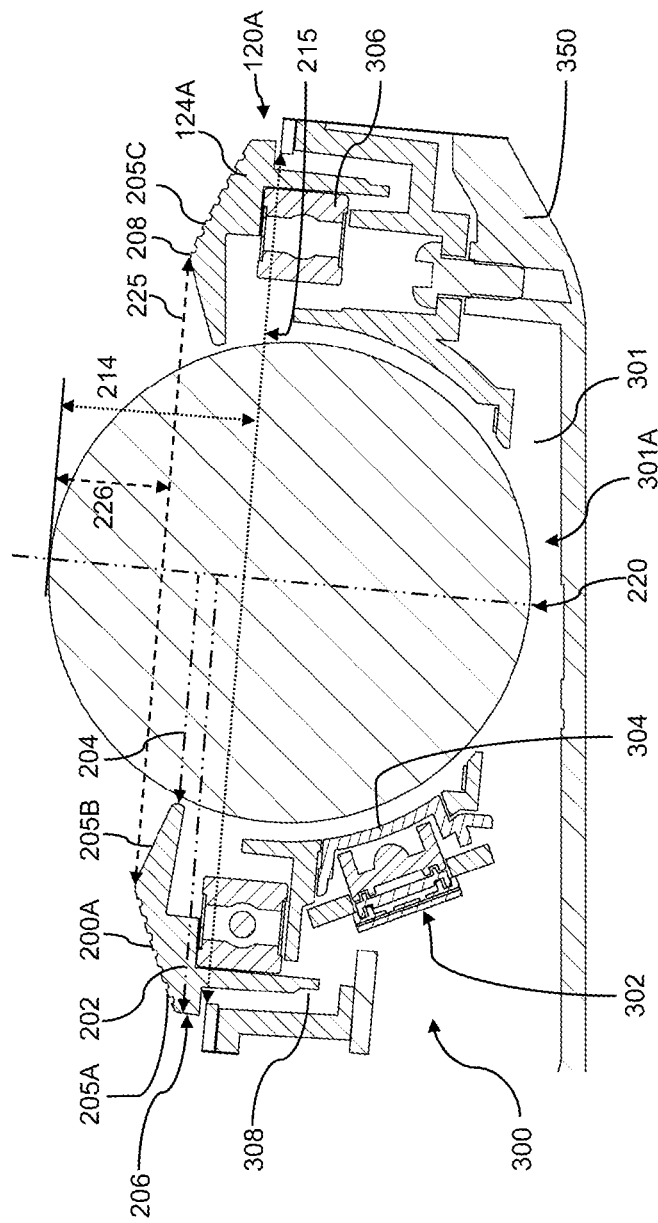
FIG. 7 is a cross section along X-X in FIG. 2 showing detail of a trackball.

FIG. 7 is a partial cross sectional view along the line X-X indicated in FIG. 2, through the track ball 120A showing the control ring 124A and ball 122A. As can be seen, the control ring 124A has an upper surface 200A. The size of the ring 124A is generally defined by its outer radius 202 and inner radius 204. The upper surface 200A has a radial surface profile that is shown by the cross section in FIG. 7. In the illustrated embodiment, the surface profile has three primary sections. A substantially cylindrical face 206 that extends around the outer circumference of said control ring. This appears as generally vertical section in the surface profile. The cylindrical face 206 presents a user with a rim or edge with which they can easily manipulate the control ring 124A. Generally speaking, a user will manipulate the ring using the cylindrical face 206 with the thumb of the hand that is operating the corresponding ball 122A. Having a cylindrical face 206 and/or an edge on that face provides good tactile feedback to the user. This may be advantageous for a user because they will typically manipulate the controls of the control surface 100, including the control ring 124A, 124B, 124C while their visual attention is concentrated on the display of the color correction system.

Moving radially inwards from the cylindrical face 206, the surface profile is inclined up an outer sloped portion 205A to a point of maximum height 208. The maximum height may be at a point 208 more than half way along the ring's surface profile to its inner edge 210. The surface profile then slopes downward on an inner sloped portion 205B to its inner edge 210. In the present embodiment, the control ring has a surface profile that includes almost linear inclined profiles, but in other embodiments the inclines may meet in a wide radius curve or be smoothly curved (e.g., arcuate) from the end of the cylindrical surface to the inner edge 210. The outer sloped portion 205A is preferably inclined at an angle that facilitates engagement by a user's fingers in use. Preferably the outer sloped portion, or possibly the entire upper surface 200A may be textured. In this embodiment, the outer sloped portion 205A has a pattern of ribs 205C. The rib pattern can also be seen clearly in FIGS. 1 and 2. Again as noted above, because a user will typically manipulate control rings 124A, 124B, 124C while their visual attention is concentrated on the display of the color correction system the texture 205C can provide a tactile feedback to the user and improve grip.

Having a control ring profile that includes an outer cylindrical portion and that then gradually builds in height towards the center of the control ring assist in addressing the dual desiderata of ease of use of the control ring and ease of stowing of a portable device.

Embodiments of the control surface 100 of the present embodiment may be further adapted for use as a portable device by minimizing the vertical height or thickness of the control surface 100. This also facilitates carrying of the control surface 100 when not in use.

The illustrated embodiment facilitates this by providing balls 122A, 122B, 122C of a relatively small diameter. As will be appreciated, the diameters of the balls 122A, 122B, 122C potentially presents a limitation on the minimum thickness of the control surface 100. Thus the overall height or thickness of the control surface 100 can be reduced by using smaller balls for the track balls. However the user experience and control accuracy when using small track balls may be impaired.

The balls 122A, 122B, 122C of the present embodiment may have a diameter that is between about 35 mm and 45 mm, but are preferably are about 40 mm in diameter. However although the balls 122A, 122B, 122C are smaller than trackballs used in conventional color correction control surfaces the expected impairment of usability can be mitigated by mounting them relatively high in the control panel 110 and/or relatively high with respect to their respective control ring.

For example, the balls 122A, 122B, 122C of said trackballs are mounted relative to a top face of the control panel 110 such that the ball has a maximum extension (214) from the top face of the control panel 110 (indicated by line 215 in FIG. 7) of more than 30% of the diameter of said ball. The extension of the balls 122A, 122B, 122C above the control panel face may be more than 35%, 37% or 40% of the diameter of the ball 122A, 122B, 122C. In the illustrative embodiment, the maximum extension of the balls 122A, 122B, 122C is about 40.5% of the diameter of said ball. The extension of the trackball can be measured in a direction parallel with an axis of rotation (220 in FIG. 7) of the control ring 124A.

In some embodiments, the ball of said trackball can extend above a highest point of its respective control ring by more than 15% of the diameter of the ball. Again, the extension of the trackball may be measured in a direction parallel with an axis of rotation (220 in FIG. 7) of the control ring 124A. In this example, the line 225 defines a plane that is perpendicular to the axis 220 and is tangential to the highest point 208 on the control ring 124A. The ball of said trackball may extends above this highest point of its respective control ring by more than 20% of the diameter of the ball. In the illustrative embodiment, the ball of said trackballs extends above the highest point of its respective control ring (dimension 226) by about 23.5% of the diameter of the ball, and in some embodiments, a greater extension, e.g., above 25%, and up to 40%.

It may also be advantageous to have a relatively large proportion of the ball 122A exposed through the aperture of the control ring 124A of the track ball 120A. That is the inside diameter of the control ring 124A (i.e., 2x the dimension of radius 204 in FIG. 7) can be relatively large compared to the diameter of the ball. In some embodiments, the inside diameter of the control ring can be more than 90% of the diameter of the ball of said trackball, but less than the diameter of the track ball. The inside diameter of the control ring can be more than 93% of the diameter of the ball of said trackball. In the illustrative embodiment, the inside diameter of the control ring is about 95% of the diameter of the ball.

This enlarged relative extension of the balls 122A, 122B, 122C through the control ring 124A, 124B, 124C increases the surface area of the ball 122A, 122B, 122C that is exposed to the user for operation of the track ball 120A, 120B, 120C and increases the diameter of the portion of the ball that is exposed for user interaction when seen in plan view. Together these effects may allow control of the trackball in a manner consistent with using a larger trackball on a conventional color control surface. Advantageously the slope of the inner sloped portion 205B of the control ring (e.g., 124A) down towards the plane of the control panel 110 enables a user to more readily access the full extent of the exposed surface of the ball (e.g., 122A) without touching the control ring (124A) in the process.

FIG. 7 also shows cross sections though some components of the housing 300 that supports and encloses the internal components of the control surface 100, and are indicated generally by reference numeral 300. An encoder 302 in the form of an optical reader can also be seen mounted below the ball 122A. A plurality of such encoders are used to track the motion of the ball 122A and generate an output signal for control of the color correction system. The encoder 302 is provided with a cover or lens 304 to protect its optical components from soiling. As will be discussed in more detail in connection with FIGS. 8 and 9, the control ring 124A also includes a bearing 306. The bearing 306 in this example is a set of ball bearings in a race that is interference fit into a recess defined by a downwardly depending flange 308. The flange 308 extends circumferentially around the underside of the control ring 124A and the bearing 306 is pushed into the circular rim provided by the flange 308.

Figure 8:
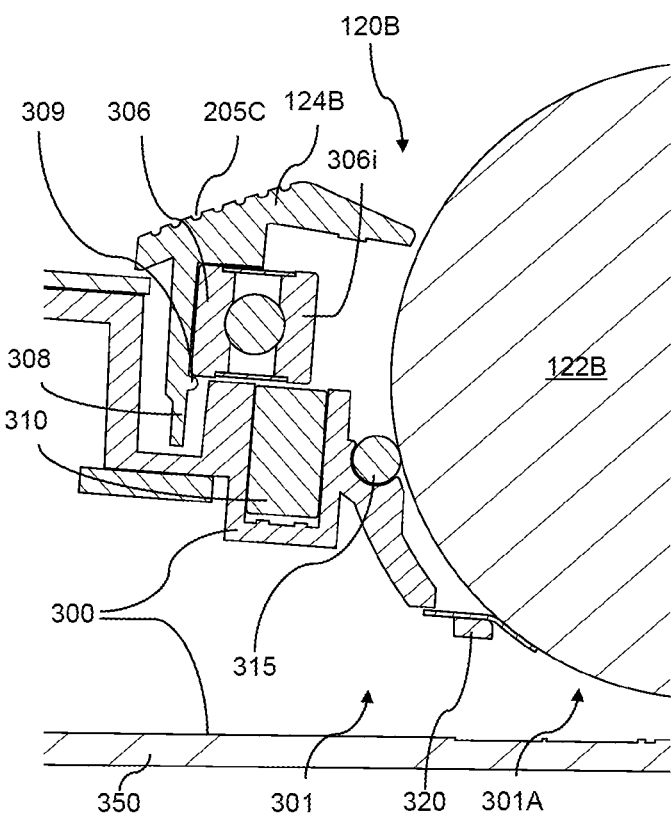
FIG. 8 is a cross section along V-V in FIG. 2 showing, inter alia, detail of a control ring mounting arrangement.
Figure 9:
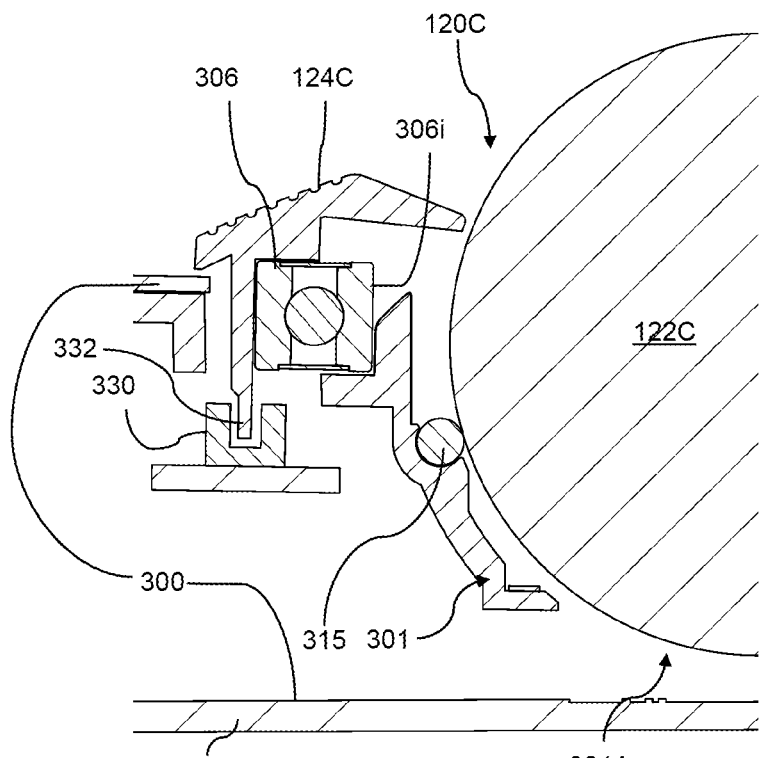
FIG. 9 is a cross section along W-W in FIG. 2 showing, inter alia, detail of a control ring mounting arrangement and encoder.

FIGS. 8 and 9 illustrate further details of a trackball 120A of the control surface 100 of an embodiment. FIG. 8 is a cross section along line V-V in FIG. 2, whereas FIG. 9 is a cross section along line W-W in FIG. 2. As will be appreciated, all trackballs in the illustrative embodiment will be the same as each other, and the position of the cross sections is chosen for clarity in FIG. 2, not to indicate differences between trackballs 120B and 120C.

The cross section at V-V shown in FIG. 8 illustrates a cross section through the ball 122B and control ring 124B to illustrate the coupling between the control ring 124B and the control panel 110. Because there may occasionally be a need to remove and clean the balls 122A, 122B, 122C and encoder sensor covers 304, it can be advantageous to have removable control rings. Thus the coupling between the control ring 124B and the remainder of the control panel can advantageously be able to be detached relatively easily. For convenience the coupling is being described as a being between a control ring and the control panel. The actual component or components to which the control ring is coupled may be part of a separable trackball assembly, the control panel chassis, a housing component or other physical structure. However, what is relevant is that control ring is coupled to a structure that held in a fixed relationship to the control panel during use. In the illustrative embodiment, the coupling uses magnetic attraction to hold the components together.

Along cross section V-V the control panel 110 has a magnet 310 mounted in a fixed position. When the control ring 124B is in its correct operating position the magnet is aligned with the control ring 124B. Specifically the, bearing race 306 mounted to the control ring 124B includes or is made of a ferromagnetic material that is attracted to the magnet 310 when in correct alignment. In this example, the inner race 306i is correspondingly aligned with the magnet 310 and made of steel, so the control ring 124B is coupled to the control panel by magnetic attraction. A plurality of such connections can be made at different points around the control ring 124B. For example, the cross section V-V can be repeated (e.g., regular 90, 120, 180 degree intervals) around the control ring. The flange 308 may be provided with one or more bosses 309 or a ridge placed around its inner circumference to ensure that the bearing 306 remains seated in the rim defined by the flange 308. In this example, the control ring 124B includes no magnetized elements that rotate with the control ring 124B in use. The magnetic elements are provided in a fixed position with respect to the control panel 110. This arrangement may minimize induced currents and hence electrical interference in the control circuitry of the control surface 100.

FIG. 8 also shows ball bearing 315 and support 320 on which the ball 122B are supported in a manner that provides suitable rolling performance in use. It may also be noted, and possibly as best appreciated in FIG. 7, that the housing components 300 and general mounting arrangement for the ball 122A, 122B, 122C define a cup 301 in which the ball 122A, 122B, 122C is suspended. However the cup 301 does not fully enclose the bottom of the ball, but instead has an aperture 301A at its lower side, through with the ball 122A, 122B, 122C protrudes. This aperture avoids the need for an extra wall between the ball 122A, 122B, 122C and the bottom surface of the housing and clearance between the ball 122A, 122B, 122C and the cup 301, and so assists in minimizing the overall height of the control surface 100.

FIG. 9 shows a cross section at W-W through the ball 122C and control ring 124C to illustrate additional details of the control ring 124C and the control panel 110. In particular, FIG. 9 additionally shows an encoder 330. This may be one of a plurality of such encoders placed to interact with the control ring 124C. In this example, the encoder 330 is a photointerrupter that detects the position of the flange 308 of the control ring 124B. The flange 308 can include a profiled lower edge 332, e.g., a castellated edge having alternating gaps and protrusions, that alternately breaks a beam of light of the photointerrupter or allows it to pass, so that rotational motion of the ring 124B can be detected and a control signal generated. In one example, the lower edge 332 may have a castellated profile.

FIG. 9 also illustrates an alignment element in the form of a tapered fin 334, several of which can be placed in a fixed arrangement around the ball 122C. The fin 334 defines the correct radial alignment of the control ring 124C with respect to the ball 122C and coupling magnets. The fin's 334 outer edge defines the correct radial position of the inner edge of the control ring mounting structure (in this case the inner bearing race 306i). The top of the fin 334 is tapered to provide a lead in, so that the control ring 124C can be conveniently aligned during replacement. Instead of individual fins the alignment element could be a full or partial circumferential rim. The cross section W-W can be repeated (e.g., regular 90, 120, 180 degree intervals) around the control ring, although it may not be necessary to repeat the inclusion of additional encoders 330 in each position.

Figure 10:
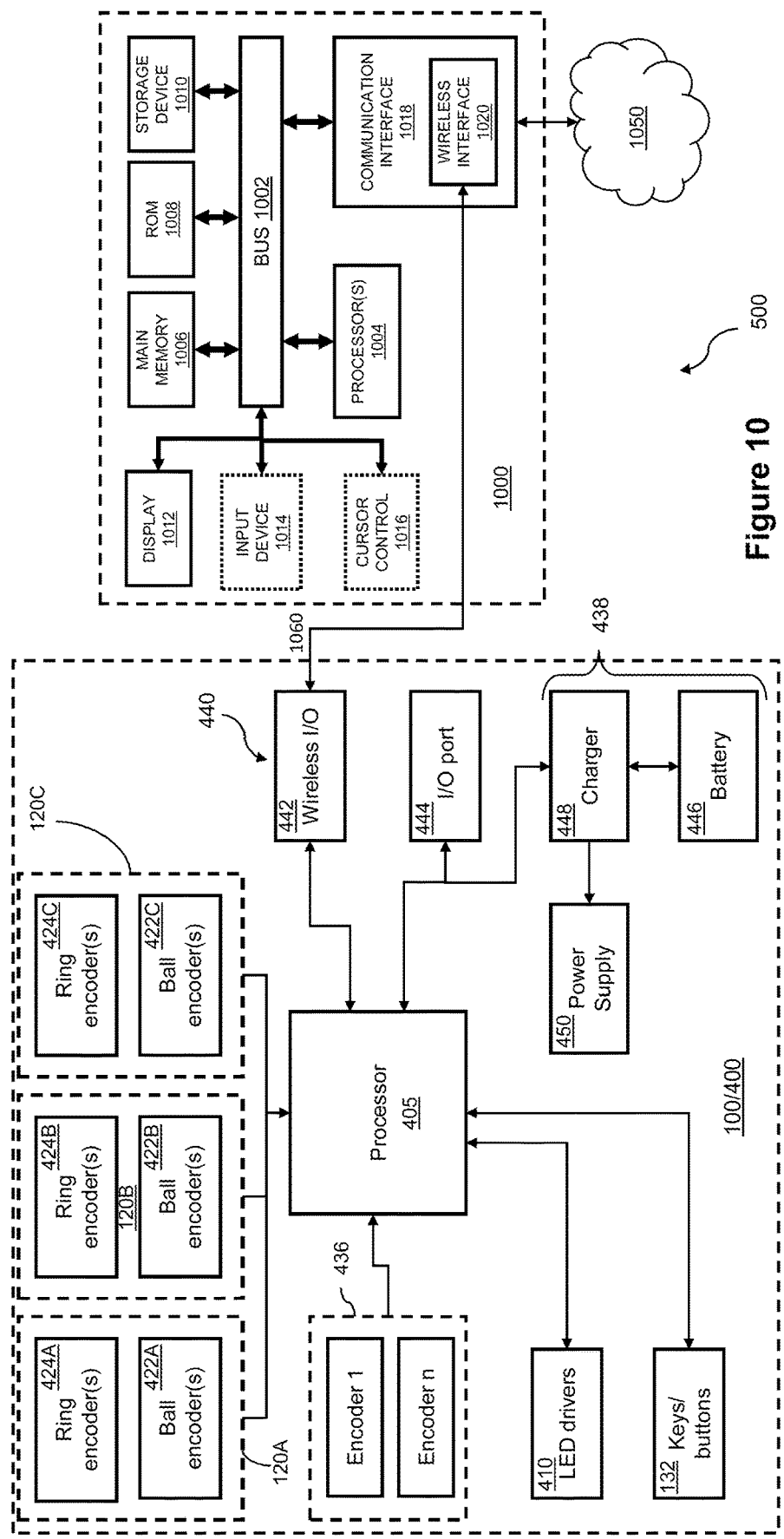
FIG. 10 illustrates a schematic block diagram of a color correction system according to an embodiment.

FIG. 10 provides a block diagram that illustrates one example of a color correction system 500 comprising a control surface 100 as described above, and a computer system 1000 running a color correction application. Computer system 1000 includes a bus 1002 or other communication mechanism for communicating information, and a hardware processor 1004 coupled with bus 1002 for processing information. Hardware processor 1004 may be, for example, one or more general-purpose microprocessors, one or more graphics processing unit, or other type of processing unit, or combinations thereof.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized and configured to perform the operations specified in the instructions.

Computer system 1000 may further include a read only memory (ROM) 1008 or other static storage device coupled to bus 1002 for storing static information and instructions for processor 1004. A storage device 1010, comprising storage media such as a magnetic disk, SSD or optical disk, may be provided and coupled to bus 1002 for storing information and instructions including the color correction application and/or image and video data that may be subject to color correction.

The computer system 1000 includes a display 1012 (such as one or more LCD, LED, touch screen displays, or other display) that may be coupled via bus 1002 for displaying information to a user of the color correction system 500. The computer system 1000 may also include an input device 1014, e.g., a keyboard including alphanumeric and other keys, that may be coupled to the bus 1002 for communicating information and command selections to processor 1004. The computer system 1000 may also include a cursor control 1016 input device, such as a mouse, a trackball, or cursor direction keys for communicating direction information and command selections to processor 1004 and for controlling cursor movement on display 1012.

According to at least one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions. The storage medium may also be used to store images or video files on which color correction may be performed.

The terms "storage media" or "storage medium" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, hard disk drive, solid state drive (SSD), magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge. Storage media may be local, in the sense it is connected to the bus 1002 or remote, in so far as it is communicatively coupled to the computer system 1000 via network connection. In this regard, computer system 1000 may also include a communication interface 1018 coupled to bus 1002.

Communication interface 1018 provides a two-way data communication coupling to a communication network 1050 or another device. For example, communication interface 1018 may include an integrated services digital network (ISDN) card, cable modem, ethernet card, satellite modem, USB interface etc. As an example, communication interface 1018 may be a local area network (LAN) card to provide a data communication connection to a compatible LAN. Wireless links may also be implemented. In the present example, the communication interface 1018 includes a wireless interface 1020. The wireless interface 1020 may operate according to any wireless communications methodology but is preferable selected from one of: an IEEE 802.11 wireless standard; Bluetooth, ZigBee or other IEEE 802.15 standard. It may alternatively use free-space optical communication.

In any such implementation, communication interface 1018 sends and receives electrical, electromagnetic or optical signals that carry digital data streams representing various types of information.

The color correction system 500 also includes a control surface 100. The control surface 100 includes circuitry 400 as set out in FIG. 4.

The control surface 100 is communicatively coupled via a network connection 1060 to the computer system 1000. In particular, the wireless communications interface 442 of the control surface 100 and wireless interface 1020 of the computer system 1000 form a wireless link over which data may be exchanged between them. In this example, the connection 1060 is Bluetooth connection but may be a connection according to a different communications methodology as described herein.

The computer system 1000 is configured to accept user control inputs from the control surface 100 via the wireless link 1060 to control operation of the color correction application running thereon.

Figure 11:
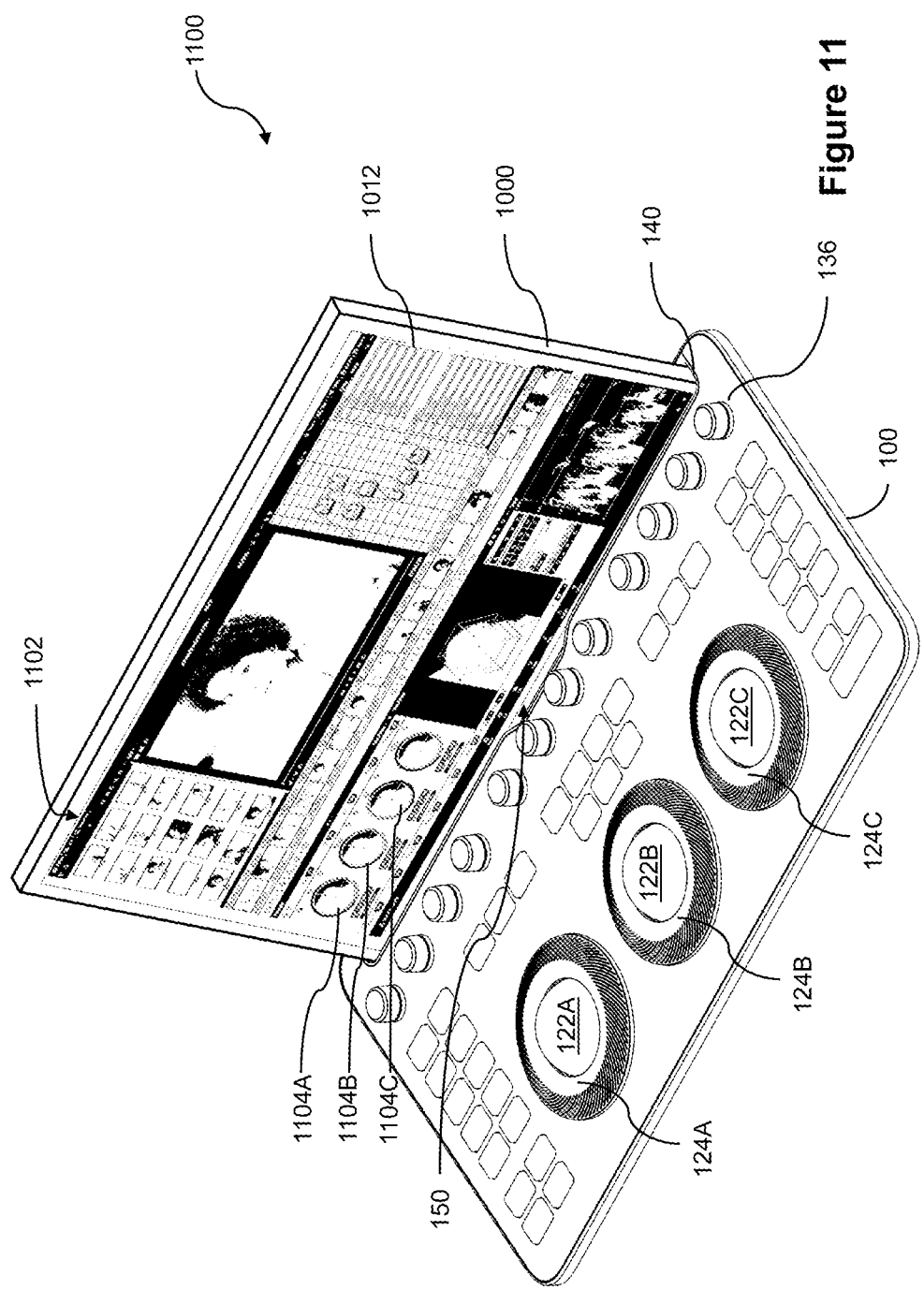
FIG. 11 illustrates a color correction system according to an embodiment including a control surface and tablet computer.

FIG. 11 illustrates an exemplary color correction system 1100, which is generally equivalent to the system 500 of FIG. 10, comprising, a computer system 1000 in the form of a tablet computer with a touchscreen, and a control surface 100. The computer system 1000 runs a non-linear editor application that has a color correction capability, such as Davinci Resolve from Blackmagic Design. A color correction graphical user interface 1102 is shown on the screen of display 1012 of the computer system 1000. Because the computer device 1000 is a tablet computer its display 1012 is integrally formed into the computer system 1000. In this case, the computer system 1000 and hence its display 1012 are supported in an upright position in the display stand 140 of the control surface 100. Despite the computer system 1000 and control surface 100 being in physical contact with each other, data communication between them is performed via a wireless communication channel as discussed using Bluetooth. Via the wireless connection with the control surface 100, user inputs made using any one or more of said plurality of trackballs, plurality of buttons and plurality of knobs, are communicated as control signals to the computer system 1000 to control the color correction application.

For example, in one embodiment, manipulation of the balls 122A, 122B, 122C on the control surface 100 let the user provide inputs to the color correction application to adjust the colors in an image based on lift, gamma and gain tonal ranges respectively. These inputs correspond to moving an indicator point on corresponding two dimensional graphical elements 1104A, 1104B and 1104C of the graphical user interface 1102. Multiple trackballs may be manipulated simultaneously in some embodiments. The control rings 124A, 124B, 124C may be used to set master levels for each variable.

The control knobs 136 may be configured to allow a user to provide inputs to the color correction application to adjust image parameters, including but not limited to contrast, saturation, hue, temperature, tint, midtone detail, color boost, shadows, highlights.

Figure 12:
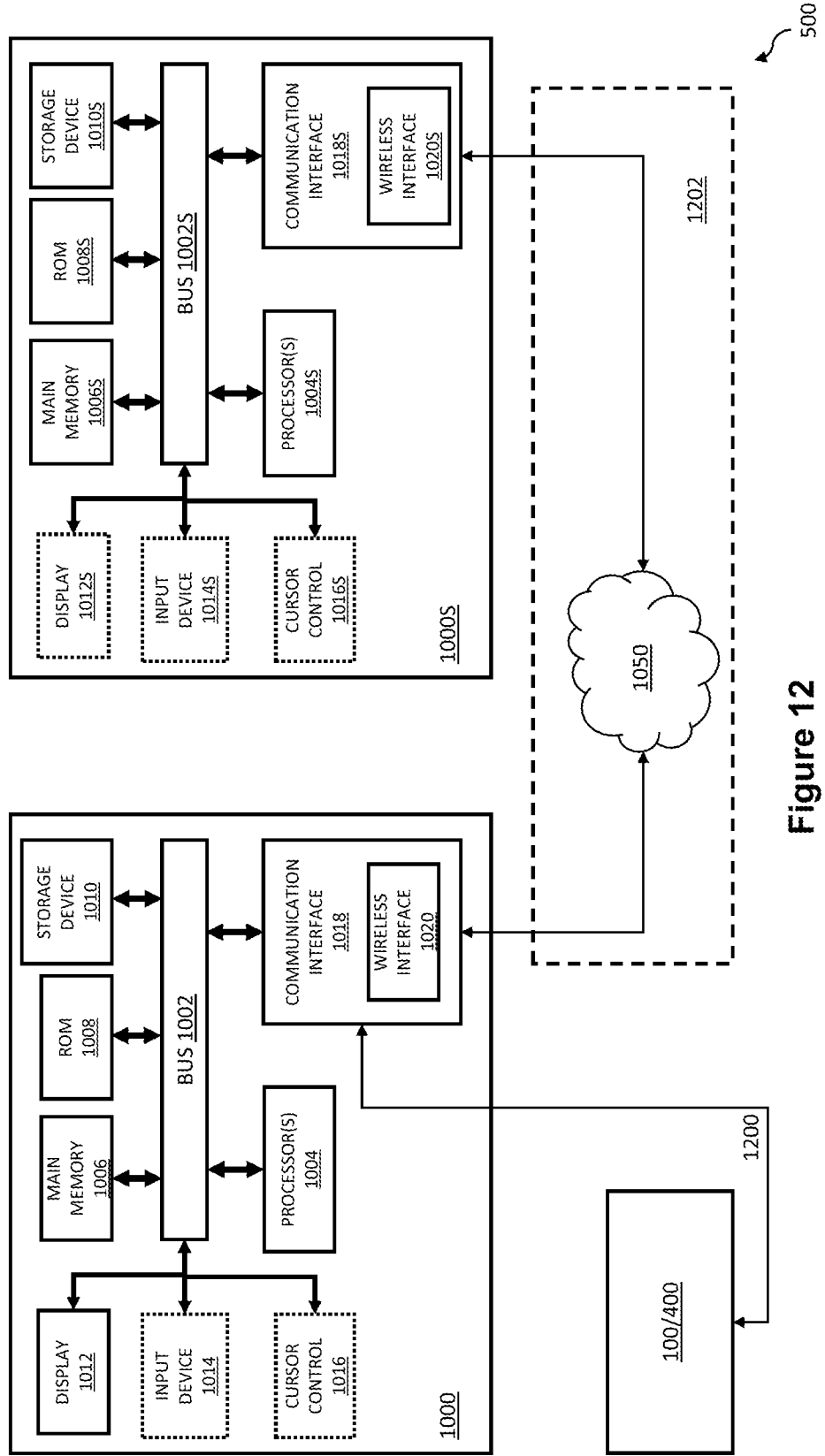
FIG. 12 illustrates a schematic block diagram of a color correction system according to an embodiment which includes a client computer system and server computer system.

FIG. 12 illustrates a further embodiment of a color correction system 500. Features in the present figure that are common with earlier figures will be labelled with common reference numerals, and such features will not be described again for brevity. The control surface 100 is of the type describe in FIGS. 1-9 and may include circuitry 400 as set out in FIG. 4. Accordingly details of the circuit 400 are omitted for ease of understanding. In overview, this embodiment differs from the previous embodiment in that the display is part of a separate device to the computer system running the color correction application. Such an embodiment may find particular application in a cloud computing situation where the color correction application (or part of its functionality) is executed on a cloud service. In the present embodiment, the display 1012 forms part of a client computer system 1000 in communication with a server computer system 1000S that runs a color correction application. This arrangement may be advantageous when the client computer system 1000 is a tablet computer, smart phone, smart television or other computing device with relatively low computing power or data storage capability, but may be used in embodiments where such performance constraints are not present.

The local computer system 1000 provides a client application (e.g., a dedicated client application or web browser) which provides a graphical user interface to a color correction application. The control surface 100 is in data communication with a client computer system 1000 using a wireless link 1200 between the wireless communications interface 1020 of the client computer 1000 and the control surface's wireless communication interface 442. Control signals representing user inputs from the plurality of controls of the control surface 100 are transmitted over the wireless link 1200 to the client computer device 1000. The client computer system 1000 is also in data communication with a server computer system 1000s via second communications connection 1202. The server computer system 1000S may be located locally or remotely from the client computer system 1000 so communication between them may be of any suitable form. In some examples, both the client computer system 1000 and server computer system 1000S may be connected to a local area network e.g., using wired Ethernet. In other embodiments, they may be connected to each other via the internet, WAN or other network using a suitable network connection mechanism. The connection 1202 may be direct or may not or may not include data transmission via intervening communication network 1050. Moreover it may include a combination of wired and wireless network connections.

The client computer system 1000 will transmit, inter alia, control signals from the plurality of controls of the control surface 100 over the connection 1202 to the server computer system 1000S for use in controlling the color correction application. The server computer system 1000S will transmit inter alia, display data for generating the graphical user interface shown on the display 1012 of the client computer system 1000. Because the display of the color correction system is remotely located from the server computer system 1000S, the server computer system 100 may not have a display 1012S or if it has a display 1012S the display may be used for tasks other than display of a graphical user interface of the color correction application. In use, the client computer system 1000 will be positioned in the display stand 140 of the control surface 100 so that its display 1012 is visible to a user of the control surface 100.

Figure 13A:
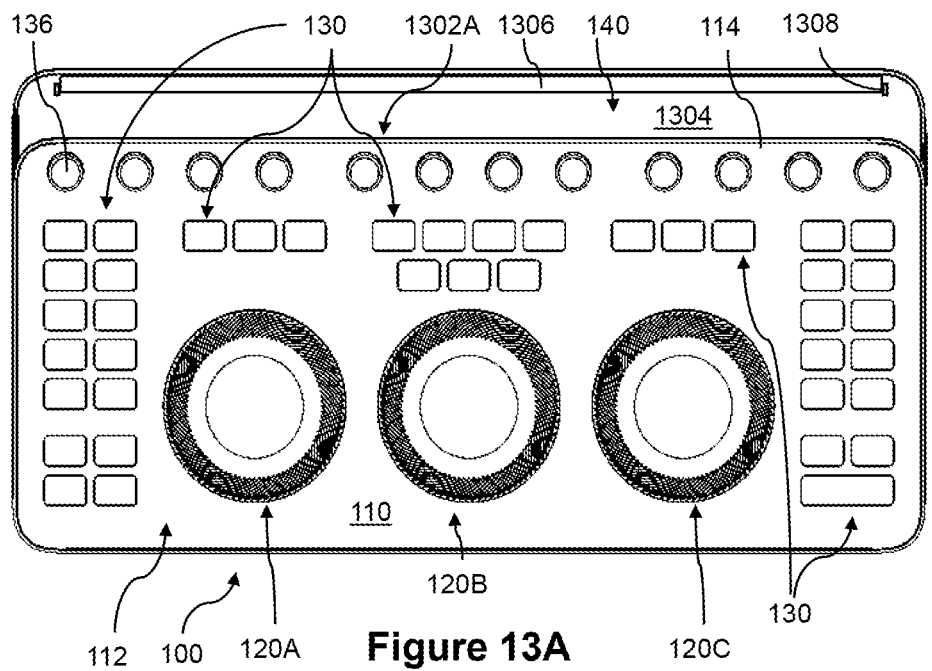
FIGS. 13A to 13N illustrate several embodiments of control surfaces with different display stands.
Figure 13B:
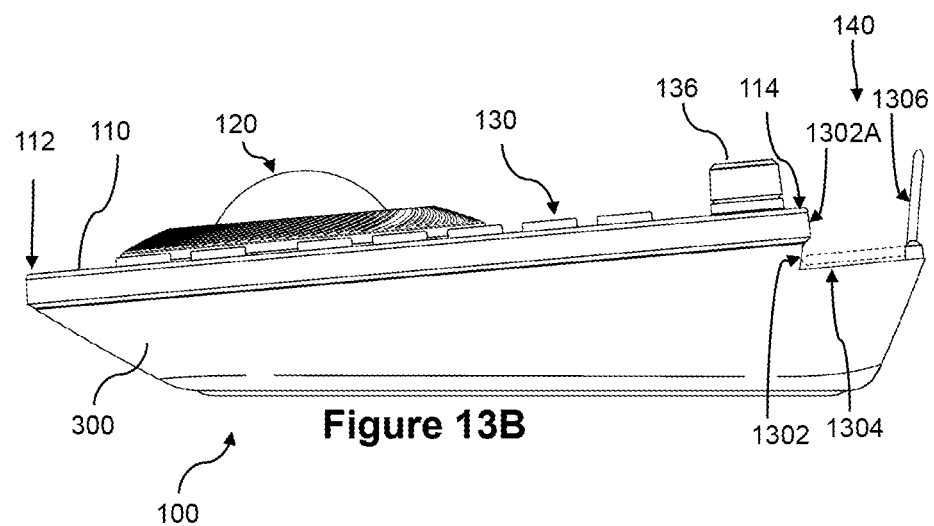
Figure 13C:
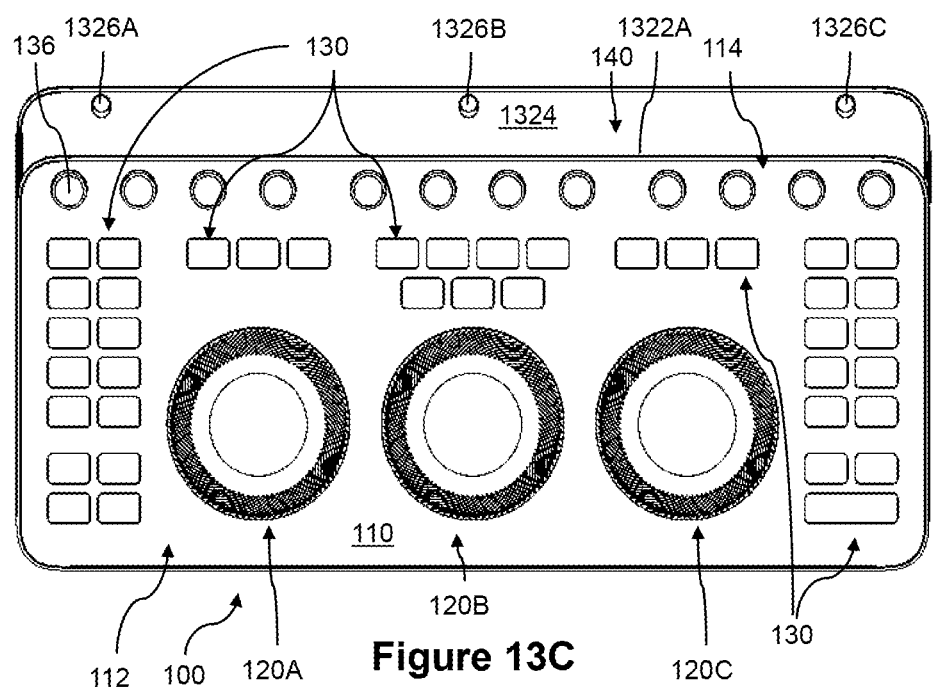
Figure 13D:
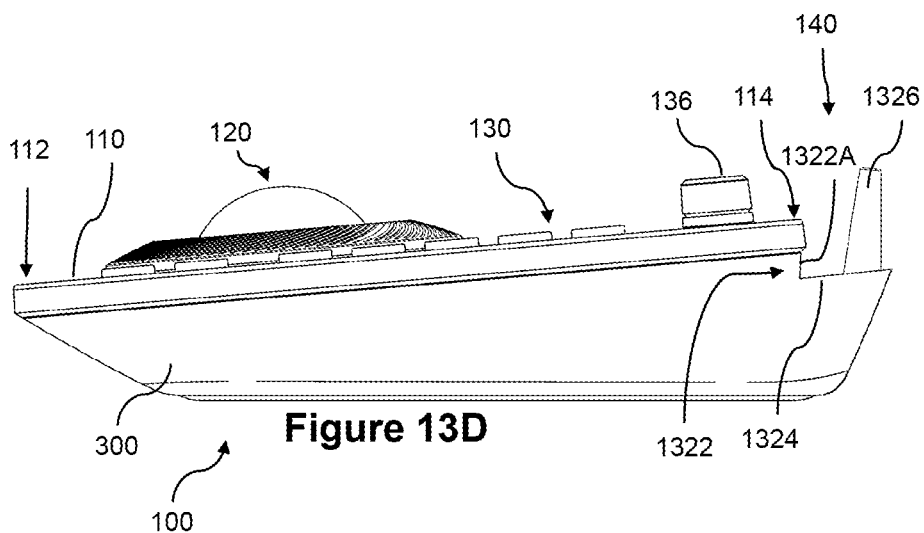
Figure 13E:
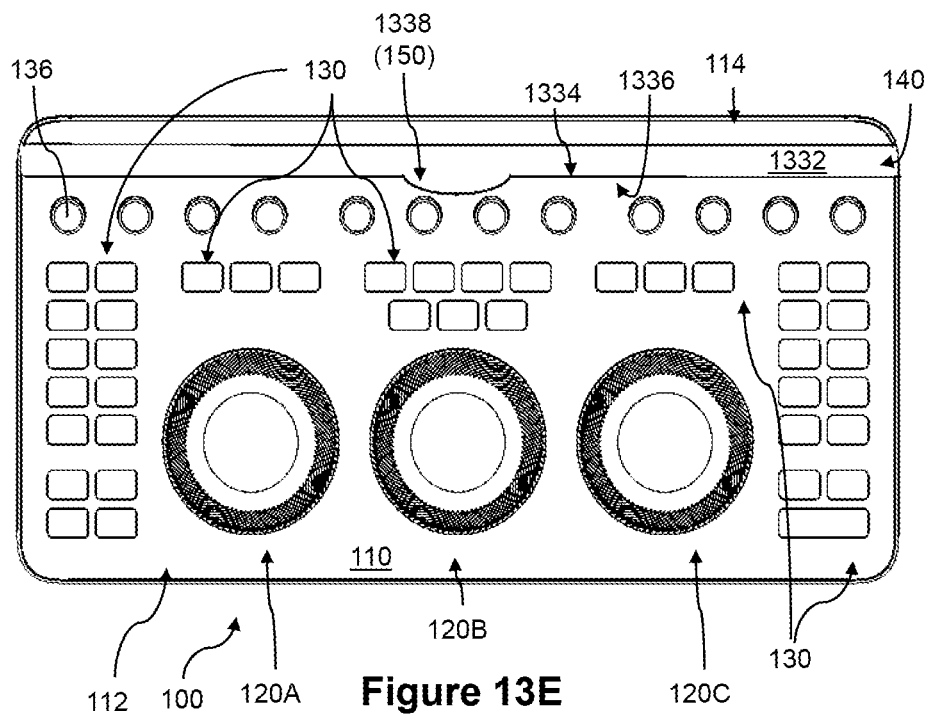
Figure 13F:
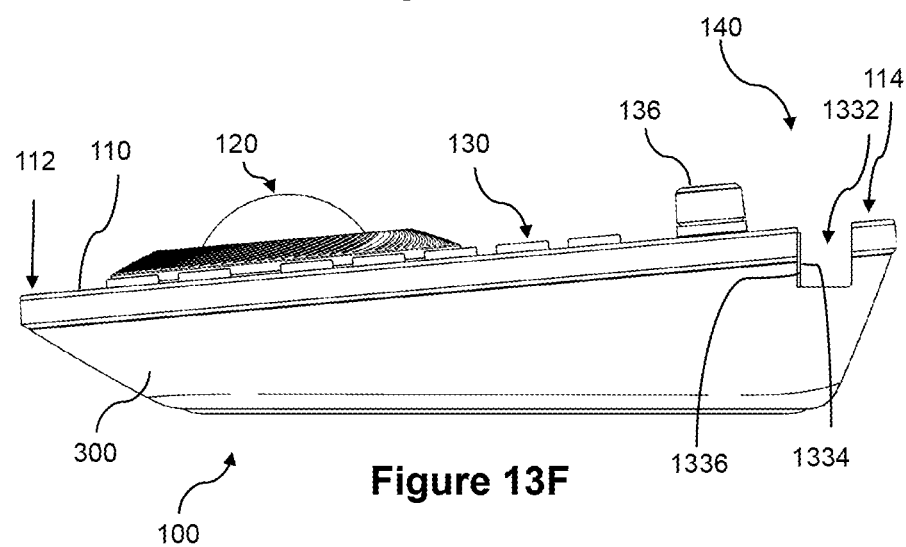
Figure 13G:
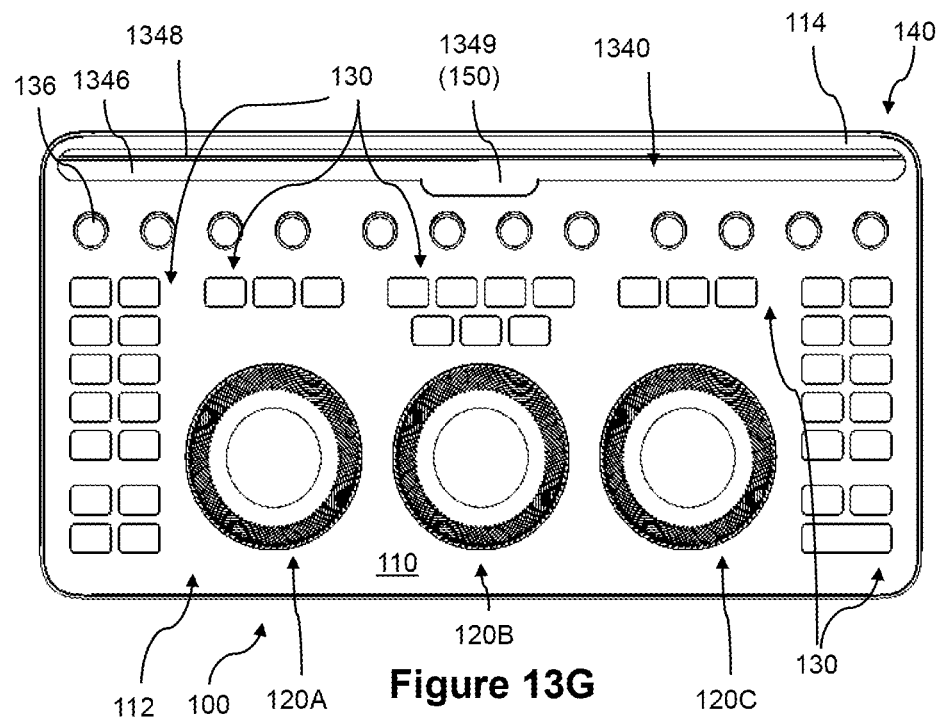
Figure 13H:
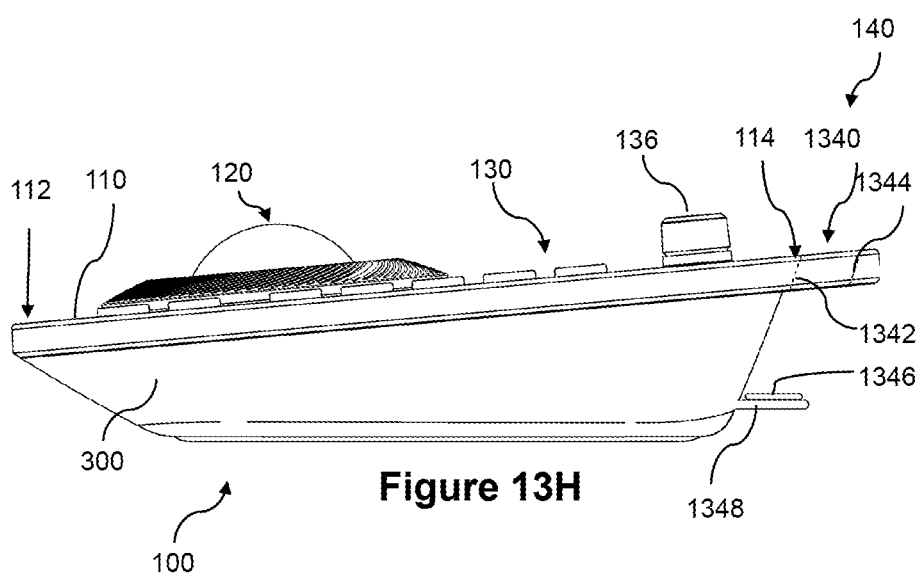
Figure 13I:
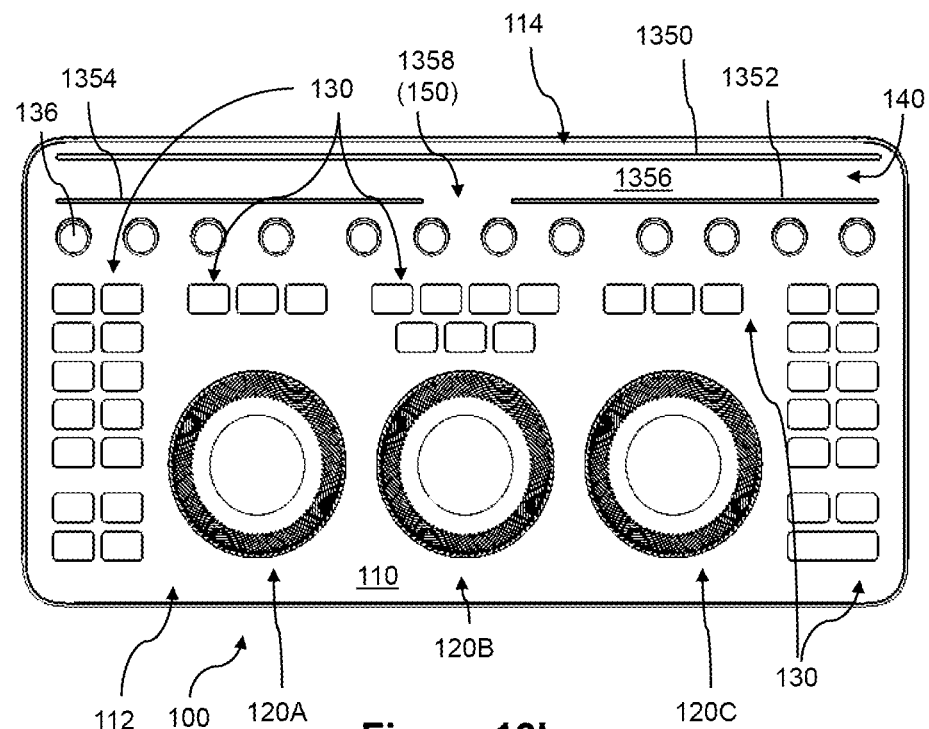
Figure 13J:
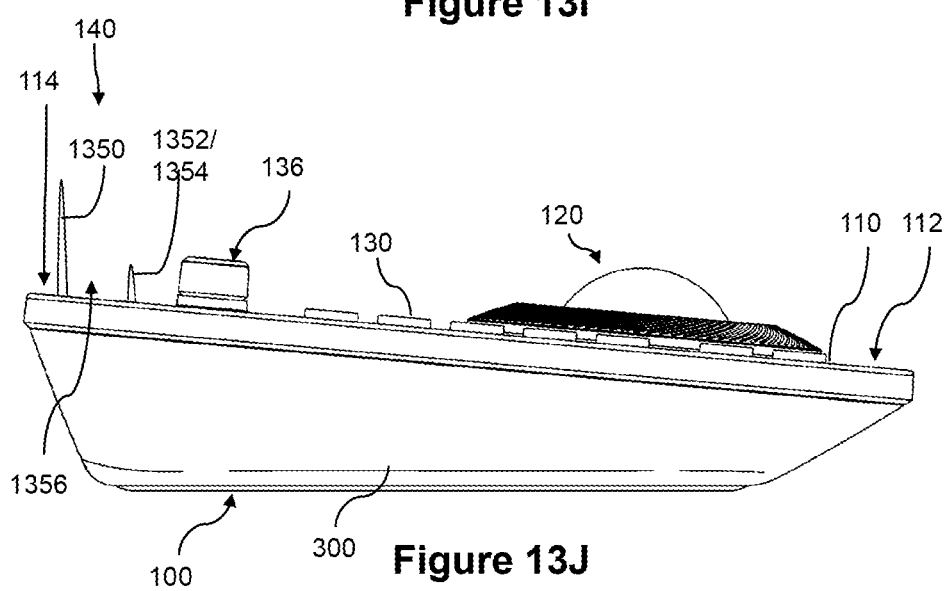
Figure 13K:
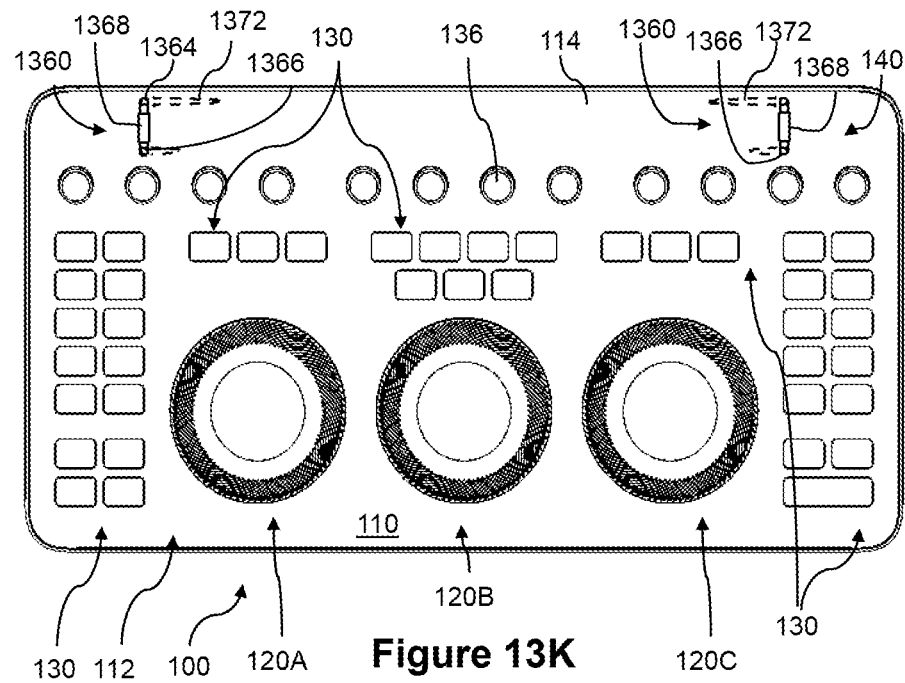
Figure 13L:
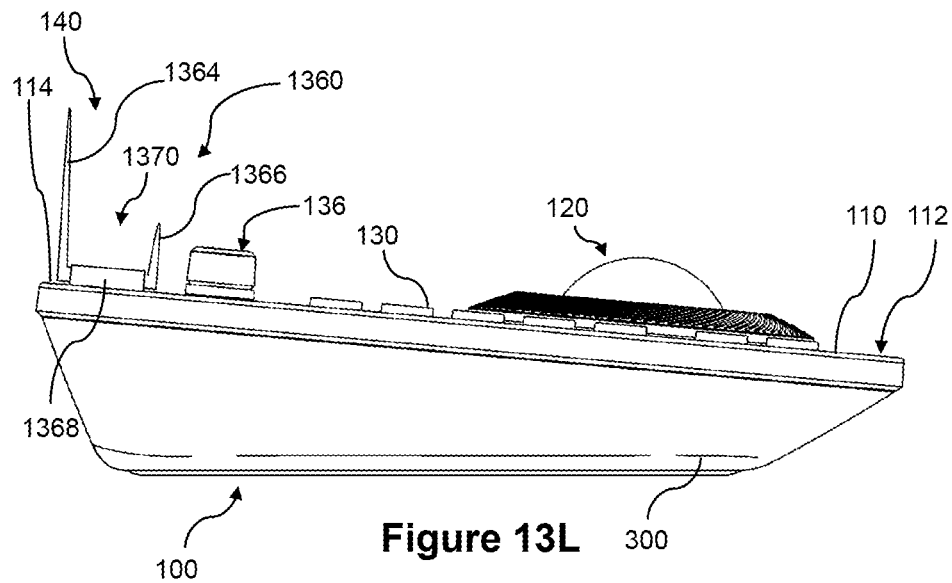
Figures 13M, 13N:
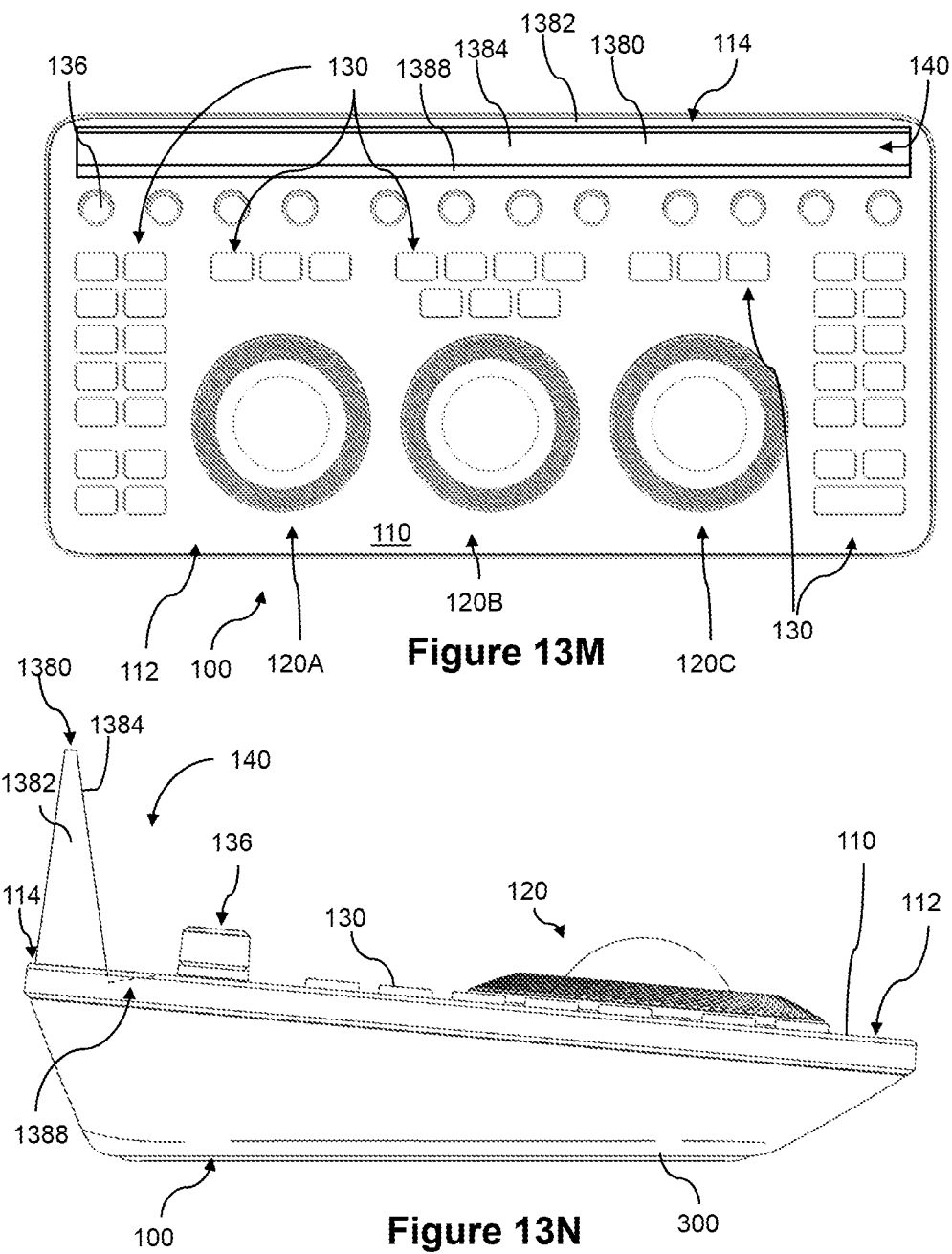

FIGS. 13A to 13N illustrate seven additional embodiments of a control surface having display stands with alternative features. In these figures, features that are common with earlier embodiments will be labelled with common reference numerals, and such features will not be described again for brevity.

In each case, the display stand 140 is able to support a display device of the color correction system in an upright position in use. In the embodiments of FIGS. 13E to 13N, the display stand 140 is positioned between the rear-most row of input controls, knobs 136, and the distal edge 114 of the control panel 110. In the embodiments of FIGS. 13A to 13D, the display stand 140 is at, or behind the distal edge 114 of the control panel 110.

In the embodiment of FIGS. 13A and 13B, the display stand 140 generally includes a step 1302 that creates a shelf 1304 behind the distal edge 114 of the control panel 110. The display stand 140 also includes a flap 1306 that is attached to hinges 1308. The flap 1306 is rotatable between a stowed position 1310 (illustrated in dotted lines in FIG. 13B) and an operational position 1312 (shown in solid lines in FIGS. 13A and 13B). When the flap 1306 is in its operational position, a display of the color correction system can be placed so that it is supported on the shelf 1304 and rests against the flap 1306 at a slightly backwardly angle that is convenient for viewing by a user. The front edge of the display of the color correction system may rest against the front most face 1302A of the step 1302 to constrain it from sliding forwards. The front face of the step 1302A is generally aligned with the distal edge 114 of the control panel 110.

In the embodiment of FIGS. 13C and 13D, the display stand 140 generally includes a step 1322 that creates a shelf 1324 behind the distal edge 114 of the control panel 110. The display stand 140 also includes three protrusions in the form of posts 1326A, 1326B, 1326C positioned along the distal edge of the shelf 1324. In use, a display of the color correction system can be placed so that it is supported on the shelf 1324 and rests against the flap 1326 at a slightly backwardly angle that is convenient for viewing by a user. The front edge of the display of the color correction system may rest against the front most face 1322A of the step 1322 to constrain it from sliding forwards. The front face of the step 1322A is generally aligned with the distal edge 114 of the control panel 110.

In the embodiment of FIGS. 13E and 13F, the display stand 140 generally includes a channel 1332 that extends the full width of the control panel 110. The channel 1332 has generally vertical side walls and a flat bottom. The front wall of the channel 1332 is provided with a gripping surface 1334. In use, a display of the color correction system can be placed so that it is supported in the channel 1332 in a similar fashion to the first embodiment. However, rather than having an overhang on the front wall 1336 of the channel 1332 to minimize the chance that the front edge of the display slides up the wall and the display falls backwards, the gripping surface 1334 is provided to provide extra friction to prevent sliding. The gripping surface 1334 may be provided in several ways, including but not limited to, providing a textured surface on the channel wall 1336, providing a textured or resilient material, along the channel wall 1336, providing a rubberized or overmolded finish on channel wall 1336. The channel 1332 also includes an arcuate widening 1338 at its center to provide an affordance 150 that aids a user in touching the lower part of the display's screen or other interface element.

In the embodiment of FIGS. 13G and 13H, the display stand 140 generally includes an aperture 1340 in the form of an elongate slot between the knobs 136 and the distal edge 114 of the control panel 110. The aperture 1340 extends almost the full width of the control panel 110. The display stand also includes a shelf 1348 extending from the rear wall of the housing 300.

In use, a display of the color correction system can be inserted through the aperture 1340 so that it extends down to and is supported on the shelf 1348. Because the display is captured within the aperture 1340 it cannot fall backwards, and rests against the rear edge 1344 of the aperture at a backwardly tilted angle.

The shelf 1348 may be provided with a cushion surface 1346. The cushion surface 1346 can be a resilient material, such as rubber strip or rubberized or overmolded surface on the shelf 1348 and can serve to prevent the display from sliding backwards off the shelf 1348. The front 1342 and rear 1344 sides of the aperture 1340 may be sloped at about the desired support angle for the display to further prevent the display from sliding backwards off the shelf 1348. The aperture 1340 includes a widened section 1349 at its center to provide an affordance 150 that aids a user in accessing the lower part of the display's screen or other interface element.

FIGS. 13I and 13J show a further embodiment. In this example, the display stand includes a plurality of flanges 1350, 1352, 1354 on the upper surface of the control panel 110 and running parallel to its distal edge 114. The rear flange 1350 is relatively tall, and the front flanges 1352 and 1354 are somewhat shorter. The front flange 1350 is spaced apart from the front flanges 1352 and 1354 so as to provide a channel 1356 between them to receive a display of the color correction system. In use, a display of the color correction system can be placed so that it is supported on control panel's top surface in the channel 1356 between the flanges 1350 and 1352, 1354. The front edge of the display can rest against front flanges 1352, 1354 to constrain it from moving forwards, while its rear side can lean against the flange 1350 to hold the display at a slightly backwardly tilted angle that is convenient for viewing by a user. The gap 1358 between the two front flanges 1352 and 1354 provides an affordance 150 so that the central part of the lowermost portion of the display is unobstructed.

FIGS. 13K and 13L show a further embodiment including a fold away display stand 140. In this example, the display stand 140 includes a two foldable frames 1360. Each frame 1360 includes a J-shaped element 1362 that includes a long rear frame leg 1364 and a short front frame leg 1366. The J-shaped element is mounted on a hinge 1368 and is movable between a stowed position 1372 (illustrated in dotted lines in FIG. 13K) and an operational position 1370 (shown in solid lines in FIGS. 13K and 13L). When the J-shaped elements 1362 is in its operational position, a display of the color correction system can be placed so that it is supported on the between the frame legs 1364, 1366. The lower edge of the display sits on the top of the hinge 1368 and is prevented from sliding forwards by the short front frame legs 1366. The display leans backwards and rests against long rear frame legs 1364 so that it is tilted slightly backwardly angle that is convenient for viewing by a user.

FIGS. 13M and 13N show a further embodiment. In this example, the display stand 140 takes the form of a screen rest 1380 that runs parallel to distal edge 114 of the control panel 110. The screen rest 1380 is shaped to support the display device at a preferred tilt angle without a specific structure to positively locate or hold the display within the screen rest 1380. The stand includes a back support 1382 that has a front face 1384 angled at the desired tilt angle. The floor 1388 of the screen rest 1380 is angled in the opposite direction to the front face 1384 of the back support 1382 and meets it at 90 degrees. A display stand can be placed on the floor 1388 of the screen rest 1380 and tilted back against the back support 1382. In some embodiments, the floor can include a cushion or gripping surface as discussed above to aid in holding the bottom of the display.

The following clauses describe various example embodiments of the present disclosure.

Clause 1. A control surface for controlling a color correction system, the control surface including:
  a housing including an upwardly facing control panel, said control panel having a proximal edge which is nearest a user in normal use and a distal edge that is furthest from a user in normal use; said control panel including a plurality of controls; the plurality of controls including:
    a plurality of trackballs, wherein each trackball comprises a ball and a control ring, said ball cooperating with at least one encoder to generate a multi-dimensional control signal based on motion of the ball, said control ring cooperating with at least one encoder to generate a one dimensional control signal based on the rotational motion of the ring, wherein the ball of said trackball is mounted concentrically with said control ring;
    a plurality of control buttons;
    a plurality of knobs coupled to respective rotary encoders;
    a display stand adjacent the distal edge of the control panel for supporting a display device of the color correction system in an upright position in use;
    a power storage system contained within the housing, said power storage system being arranged to supply power to the control surface in use; and
    a wireless communications interface over which control signal from the plurality of controls are transmitted for use in controlling the color correction system.

Clause 2. A control surface as set out in clause 1 wherein the power supply system includes one or more of:
  a battery; and
  a charging system.

Clause 3. A control surface as set out in either of clauses 1 or 2 the wireless communications interface operates according to one of the following wireless communications methodologies:
  an IEEE 802.11 wireless standard; Bluetooth, ZigBee or other IEEE 802.15 standard, free-space optical communication.

Clause 4. A control surface as set out in any one of the preceding clauses wherein the display stand comprises any one or more of the following
  boss, protrusion, rib, lip, flange, beam, channel, step, hole, recess, aperture, indentation, slot, cushion, gripping surface, frame, wall, ledge, shelf, frame, hook and cradle
  arranged to perform any one or more of the following:
    support the weight of the display device of the color correction system in use;
    constrain any one or more of sliding, twisting, or tilting of the display device of the color correction system in use;
    act as a fulcrum that supports display device of the color correction system in use;
    grip the display device of the color correction system in use.

Clause 5. A control surface as set out in any one of the preceding clauses wherein the display stand comprises a channel extending adjacent to the distal edge of the control panel, said channel being adapted to receive an edge of a display device of the color correction system in use, said channel having a front support surface that limits movement of a supported display device of the color correction system in a proximal direction, and a rear support surface that constrains tilting of the supported display device of the color correction system in a distal direction.

Clause 6. A control surface as set out in any one of the preceding clauses wherein supporting a display device of the color correction system in an upright position comprises supporting the display device of the color correction system such that it is tilted in a distal direction at an angle of more than 10 degrees from vertical.

Clause 7. A control surface as set out in any one of the preceding clauses wherein the display stand includes an affordance to enable a user to touch a screen of a supported display device of a color correction system, adjacent to the lowermost edge of the screen.

Clause 8. A control surface as set out in clause 7 wherein the affordance enables a user to touch a central part of the lowermost edge of the screen.

Clause 9. A control surface as set out in either of clauses 7 or 8 wherein the affordance is a recess, indentation, groove, or gap.

Clause 10. A control surface as set out in any one of the preceding clauses wherein an arrangement of the trackballs is symmetrical about a centerline of the control panel.

Clause 11. A control surface as set out in clause 10 wherein the display stand can support a display device of the color correction system in a position such that a screen of the display device is symmetrical about said centerline.

Clause 12. A control surface as set out in clause 11 wherein the display stand is symmetrical about said centerline.

Clause 13. A control surface as set out in any one of clauses 10 to 12 wherein the buttons on the control panel are arranged in groups, and wherein said groups of buttons are positioned symmetrically about the centerline of the control panel.

Clause 14. A control surface as set out in clause 13 wherein an arrangement of buttons within at least one pair of symmetrically arranged groups of buttons are different to each other.

Clause 15. A control surface as set out in any one of clauses 10 to 14 wherein an arrangement of the knobs is symmetrical about the centerline of the control panel.

Clause 16. A control surface as set out in any one of the preceding clauses wherein said control rings have an upper surface with an outer radius and an inner radius and a surface profile extending in a radial direction that is generally inclined from its outer radius to a point more than half way to its inner radius.

Clause 17. A control surface as set out in clause 16 wherein said surface profile is generally inclined from its inner radius to a point less than half way to its outer radius.

Clause 18. A control surface as set out in any one of the preceding clauses wherein said control rings include a substantially cylindrical face around their outer circumference.

Clause 19. A control surface as set out in any one of the preceding clauses wherein the balls of said trackballs are mounted relative to a top face of the control panel such that the ball has a maximum extension from the top face of the control panel of more than 30% of the diameter of said ball, wherein said extension is measured in a direction parallel with an axis of rotation of the control ring.

Clause 20. A control surface as set out in clause 19 wherein the maximum extension is more than 35% of the diameter of said ball.

Clause 21. A control surface as set out in clause 19 wherein the maximum extension is more than 37% of the diameter of said ball.

Clause 22. A control surface as set out in clause 19 wherein the maximum extension is more than 40% of the diameter of said ball.

Clause 23. A control surface as set out in clause 19 wherein the maximum extension is about 40.5% of the diameter of said ball.

Clause 24. A control surface as set out in any one of the preceding clauses wherein each control ring includes a coupling that engages with a corresponding coupling mounted in a fixed position with respect to the control panel such that when the control ring is coupled to the corresponding coupling, said control ring retains the ball of a respective trackball in an operating position in the control panel.

Clause 25. A control panel as set out in clause 24 wherein the coupling of the control ring is magnetically attracted to a corresponding coupling of the control panel.

Clause 26. A control panel as set out in clause 25 wherein said corresponding coupling includes one or more magnets to attract a non-magnetized component of the control ring's coupling.

Clause 27. A control surface as set out in any one of the preceding clauses wherein supporting a display device of the color correction system in an upright position comprises supporting the display device of the color correction system such that it is tilted in a distal direction at an angle of less than 40 degrees from vertical.

Clause 28. A control surface as set out in any one of the preceding clauses wherein supporting a display device of the color correction system in an upright position comprises supporting the display device of the color correction system such that it is tilted in a distal direction at an angle of less than 20 degrees from vertical.

Clause 29. A control surface as set out in any one of the preceding clauses wherein supporting a display device of the color correction system in an upright position comprises supporting the display device of the color correction system such that it is tilted in a distal direction at an angle of about 17 degrees from vertical.

Clause 30. A control surface as set out in any one of the preceding clauses wherein a ball of said trackball extends above a highest point of its respective control ring, by more than 15% of the diameter of said ball, wherein said extension is measured in a direction parallel with an axis of rotation of the control ring.

Clause 31. A control surface as set out in clause 30 wherein ball of said trackball extends above a highest point of its respective control ring, by between 23% and 24% of the diameter of said ball.

Clause 32. A control surface as set out in any one of the preceding clauses wherein the inside diameter of the control ring is more than 90% of the diameter of the ball of said trackball.

Clause 33. A control surface as set out in clause 32 wherein the inside diameter of the control ring is less than 100% of the diameter of the ball of said trackball.

Clause 34. A control surface as set out in clause 32 wherein the inside diameter of the control ring is about 95% of the diameter of the ball of said trackball.

Clause 35. A color correction system comprising:
a computer system configured to run a color correction application, a display arranged to display a graphical user interface for the color correction application;
a control surface as set out in any one of the preceding clauses;
said control surface being in data communication with the computer system such that user inputs made using any one or more of said plurality of trackballs, plurality of buttons and plurality of knobs are communicated as control signals to the computer system to control said color correction application.

Clause 36. The color correction system as set out in clause 35 wherein the display forms part of a tablet computer.

Clause 37. The color correction system as set out in clause 37 wherein the tablet computer is supported in the display stand of the control surface.

Clause 38. The color correction system as set out in either clause 36 or 37 said tablet computer comprises the computer system and display in a single unit.

Clause 39. The color correction system as set out in either clause 36 or 37 said computer system configured to run a color correction application is separate from the tablet computer and in data communication therewith.

Clause 40. The color correction system as set out in 40 wherein said computer system comprises a computer server and said tablet computer comprises a client in data communication with said computer server, and wherein a graphical user interface of the color correction application is provided by said client.

Clause 41. The color correction system as set out in any one of claims 35 to 41 wherein said control surface is in data communication with the computer system via at least one wireless network connection.

Any definitions expressly provided herein for terms contained in the appended claims shall govern the meaning of those terms as used in the claims. No limitation, element, property, feature, advantage or attribute that is not expressly recited in a claim should limit the scope of the claim in any way.

As used herein, the terms "include" and "comprise" (and variations of those terms, such as "including", "includes", "comprising", "comprises", "comprised" and the like) are intended to be inclusive and are not intended to exclude further features, components, integers or steps.

For aspects of the disclosure that have been described using flowcharts, a given flowchart step could potentially be performed in various ways and by various devices, systems or system modules. A given flowchart step could be divided into multiple steps and/or multiple flowchart steps could be combined into a single step, unless the contrary is specifically noted as essential. Furthermore, the order of the steps can be changed without departing from the scope of the present disclosure, unless the contrary is specifically noted as essential.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A control surface for controlling a color correction system, the control surface including:
   a portable housing including an upwardly facing control panel, said control panel having a proximal edge which is nearest a user in normal use and a distal edge that is furthest from a user in normal use, the distal edge being substantially straight and having a height of between 30 mm and 50 mm, and said control panel including a plurality of controls, the plurality of controls including:
      a plurality of trackballs mounted in a proximal half of the control panel, wherein each trackball comprises a ball and a control ring, said ball cooperating with at least one encoder to generate a multi-dimensional control signal based on motion of the ball, and said control ring cooperating with at least one encoder to generate a one-dimensional control signal based on rotational motion of the control ring, wherein the ball of said trackball is mounted concentrically with said control ring;
      a plurality of control buttons;
      a plurality of knobs coupled to respective rotary encoders;
   a display stand adjacent the distal edge of the control panel for supporting a display device of the color correction system in an upright position in use;
   a power storage system contained within the housing, said power storage system being arranged to supply power to the control surface in use; and
   a wireless communications interface over which control signals from the plurality of controls are transmitted for use in controlling the color correction system,
   wherein the display stand comprises a channel extending adjacent to the distal edge of the control panel, said channel being between the distal edge of the control panel and a rearmost control of the plurality of controls, said channel being adapted to removably receive an edge of a display device of the color correction system in use, said channel having a front support surface that limits movement of a supported display device of the color correction system in a proximal direction, and a rear support surface that constrains tilting of the supported display device of the color correction system in a distal direction.

2. The control surface as claimed in claim 1 wherein the display stand further comprises any one or more of the following:
   a boss, protrusion, rib, lip, flange, beam, step, hole, recess, aperture, indentation, slot, cushion, gripping surface, frame, wall, ledge, shelf, frame, or hook and cradle, arranged to perform any one or more of the following:
      support the weight of the display device of the color correction system in use;
      constrain any one or more of sliding, twisting, or tilting of the display device of the color correction system in use;
      act as a fulcrum that supports display device of the color correction system in use; or
      grip the display device of the color correction system in use.

3. The control surface as claimed in claim 1 wherein supporting a display device of the color correction system in an upright position comprises supporting the display device of the color correction system such that the display device is tilted in a distal direction at an angle of more than 10 degrees from vertical.

4. The control surface as claimed in claim 1 wherein the display stand includes an affordance to enable a user to touch a screen of a supported display device of a color correction system, adjacent to a lowermost edge of the screen.

5. The control surface as claimed in claim 1 wherein said control rings have an upper surface with an outer radius and an inner radius and a surface profile extending in a radial direction that is generally inclined from the outer radius to a point more than halfway to the inner radius.

6. The control surface as claimed in claim 1 wherein said control rings include a substantially cylindrical face around their outer circumference.

7. The control surface as claimed in claim 1 wherein the balls of said plurality of trackballs are each mounted relative to a top face of the control panel such that the ball has a maximum extension from the top face of the control panel of more than 30% of the diameter of said ball, wherein said maximum extension is measured in a direction parallel with an axis of rotation of the control ring.

8. The control surface as claimed in claim 7 wherein the maximum extension is about 40.5% of the diameter of said ball.

9. The control surface as claimed in claim 1 wherein each control ring includes a coupling that engages with a corresponding coupling mounted in a fixed position with respect to the control panel such that when the control ring is coupled to the corresponding coupling, said control ring retains the ball of a respective trackball in an operating position in the control panel.

10. The control surface as claimed in claim 9 wherein the coupling of the control ring is magnetically attracted to the corresponding coupling of the control panel.

11. The control surface as claimed in claim 1 wherein a ball of said trackball extends above a highest point of its respective control ring by more than 15% of the diameter of said ball, wherein said extension is measured in a direction parallel with an axis of rotation of the respective control ring.

12. The control surface as claimed in claim 1 wherein the inside diameter of the control ring is more than 90% of the diameter of the ball of said trackball.

13. The control surface as claimed in claim 12 wherein the inside diameter of the control ring is less than 100% of the diameter of the ball of said trackball.

14. A color correction system, comprising:
- a computer system configured to run a color correction application;
- a display arranged to display a graphical user interface for the color correction application; and
- a control surface as claimed in claim 1;
- wherein said display is removably insertable into the channel of the display stand of the control surface, and said control surface is in data communication with the computer system such that user inputs made using any one or more of said plurality of trackballs, said plurality of control buttons, and said plurality of knobs are communicated as control signals to the computer system to control said color correction application.

15. The color correction system as claimed in claim 14 wherein the display forms part of a tablet computer.

16. The color correction system as claimed in claim 15 wherein said tablet computer comprises the computer system and display in a single unit.

17. The color correction system as claimed in claim 15 wherein said computer system configured to run the color correction application is separate from the tablet computer and in data communication therewith.

18. The color correction system as claimed in claim 17 wherein said computer system comprises a computer server and said tablet computer comprises a client in data communication with said computer server, and wherein a graphical user interface of the color correction application is provided by said client.

19. The color correction system as claimed in claim 14 wherein said control surface is in data communication with the computer system via at least one wireless network connection.

20. The control surface as claimed in claim 1 wherein the display stand does not protrude above a plane of the control panel.

21. The control surface as claimed in claim 1 wherein the control panel slopes downwards from the distal edge to the proximal edge.

22. The control surface as claimed in claim 21 wherein the proximal edge of the control panel has a height of between 20 mm and 28 mm.

\* \* \* \* \*